United States Patent
Fuller et al.

(10) Patent No.: US 10,948,102 B2
(45) Date of Patent: *Mar. 16, 2021

(54) TWO-STAGE FLUID CONTROL VALVE HAVING A FIRST STAGE BI-STABLE TWO-PORT VALVE AND A SECOND STAGE MICROVALVE

(71) Applicant: DunAn Microstaq, Inc., Austin, TX (US)

(72) Inventors: E. Nelson Fuller, Manchester, MI (US); Parthiban Arunasalam, Austin, TX (US); Joe A. Ojeda, Austin, TX (US)

(73) Assignee: DunAn Microstaq, Inc., Austin, TX (US)

( * ) Notice: Subject to any disclaimer, the term of this patent is extended or adjusted under 35 U.S.C. 154(b) by 40 days.

This patent is subject to a terminal disclaimer.

(21) Appl. No.: 16/253,382

(22) Filed: Jan. 22, 2019

(65) Prior Publication Data
US 2019/0338866 A1    Nov. 7, 2019

Related U.S. Application Data

(60) Provisional application No. 62/665,688, filed on May 2, 2018.

(51) Int. Cl.
*F16K 31/08* (2006.01)
*F16K 99/00* (2006.01)

(52) U.S. Cl.
CPC .... *F16K 31/082* (2013.01); *F16K 2099/0096* (2013.01)

(58) Field of Classification Search
CPC ........ F16K 31/082; F16K 31/60; F16K 31/10; F16K 31/0655; F16K 31/52408;
(Continued)

(56) References Cited

U.S. PATENT DOCUMENTS

| 4,253,493 A * | 3/1981 | English | F01L 9/04 137/625.18 |
| 6,523,560 B1 | 2/2003 | Williams et al. | |

(Continued)

FOREIGN PATENT DOCUMENTS

| WO | 2014209988 A1 | 12/2014 | |
| WO | WO-2016025822 A1 * | 2/2016 | F16K 7/045 |

OTHER PUBLICATIONS

Hiemstra, "The Design of Moving Magnet Actuators for Large-Range Flexure-Based Nanopositioning", Thesis for Degree of Master of Science in Engineering, 2014, pp. 1-317.
(Continued)

*Primary Examiner* — Eric Keasel
(74) *Attorney, Agent, or Firm* — MacMillan, Sobanski & Todd, LLC

(57) ABSTRACT

A two-stage fluid control valve includes a first stage electronically switchable, bi-stable two-port valve movable between an open position and a leak-free closed position, and a second stage microvalve configured to control the flow of fluid through a fluid outlet of the two-stage fluid control valve when the first stage electronically switchable, bi-stable two-port valve is in the open position. The electronically switchable, bi-stable two-port valve is disposed between the second stage microvalve and a fluid inlet of the two-stage fluid control valve.

19 Claims, 23 Drawing Sheets

(58) Field of Classification Search
CPC ......... F16K 37/0041; F16K 2099/0096; F16K 2099/0069
See application file for complete search history.

(56) References Cited

U.S. PATENT DOCUMENTS

| | | |
|---|---|---|
| 6,540,203 B1 * | 4/2003 | Hunnicutt ............. B60T 8/3695 251/129.01 |
| 6,845,962 B1 | 1/2005 | Barron et al. |
| 7,156,365 B2 | 1/2007 | Fuller et al. |
| 10,190,702 B2 | 1/2019 | Fuller et al. |
| 10,576,201 B2 * | 3/2020 | Payne ................. A61M 39/227 |
| 10,760,702 B2 * | 9/2020 | Fuller ................. F16K 31/0651 |

OTHER PUBLICATIONS

Meneroud et al., "Bistable Micro Actuator for Energy Saving", Actuator, 2006, pp. 744-747.

* cited by examiner

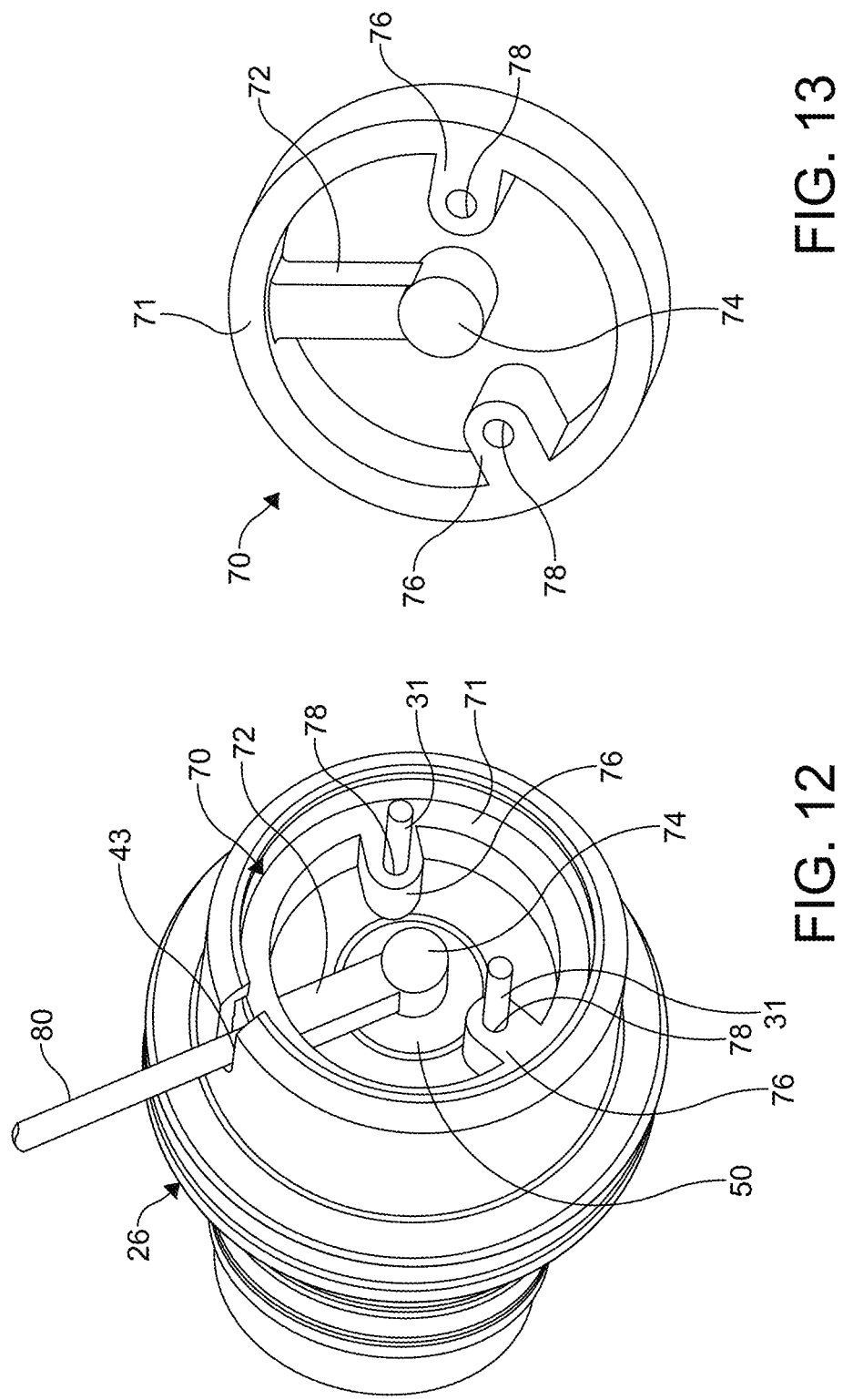

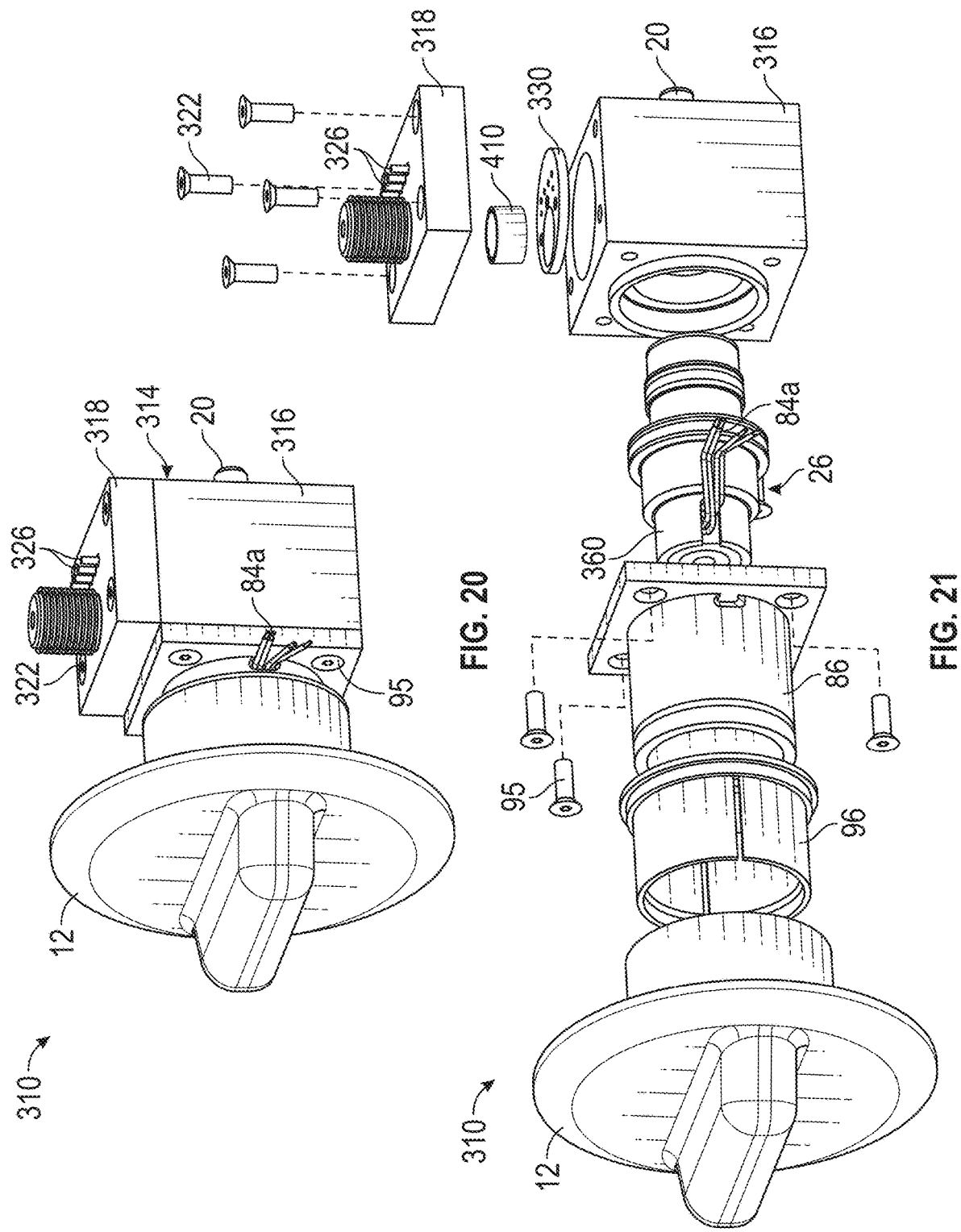

TWO-STAGE FLUID CONTROL VALVE HAVING A FIRST STAGE BI-STABLE TWO-PORT VALVE AND A SECOND STAGE MICROVALVE

BACKGROUND OF THE INVENTION

This invention relates in general to fluid control valves. In particular, this invention relates to an improved two-stage fluid control valve that includes a first stage electronically switchable, bi-stable two-port valve configured to control fluid flow to a second stage microvalve, such as for use in a system that requires a positive shut-off function.

MEMS (Micro Electro Mechanical Systems) are a class of systems that are physically small, having features with sizes in the micrometer range, i.e., about 10 µm or smaller. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today, there are many more micromachining techniques and materials available. The term "micromachined device" as used in this application means a device having some features with sizes of about 10 µm or smaller, and thus by definition is at least partially formed by micromachining. More particularly, the term "microvalve" as used in this application means a valve having features with sizes of about 10 µm or smaller, and thus by definition is at least partially formed by micromachining. The term "microvalve device" as used in this application means a micromachined device that includes a microvalve, and that may include other components. It should be noted that if components other than a microvalve are included in the microvalve device, these other components may be micromachined components or standard sized (larger) components. Similarly, a micromachined device may include both micromachined components and standard sized (larger) components.

Various microvalve devices have been proposed for controlling fluid flow within a fluid circuit. A typical microvalve device includes a displaceable member or valve component movably supported by a body for movement between a closed position and a fully open position. When placed in the closed position, the valve component substantially blocks or closes a first fluid port that is otherwise in fluid communication with a second fluid port, thereby preventing fluid from flowing between the fluid ports. When the valve component moves from the closed position to the fully open position, fluid is increasingly allowed to flow between the fluid ports.

U.S. Pat. Nos. 6,523,560; 6,540,203; and 6,845,962, the disclosures of which are incorporated herein by reference, describe microvalves made of multiple layers of material. The multiple layers are micromachined and bonded together to form a microvalve body and the various microvalve components contained therein, including an intermediate mechanical layer containing the movable parts of the microvalve. The movable parts are formed by removing material from the intermediate mechanical layer (by known micromachined device fabrication techniques, such as, but not limited to, deep reactive ion etching) to create a movable valve element that remains attached to the rest of the part by a spring-like member. Typically, the material is removed by creating a pattern of slots through the material to achieve the desired shape. The movable valve element will then be able to move in one or more directions an amount roughly equal to the slot width.

U.S. Pat. No. 7,156,365, the disclosure of which is also incorporated herein by reference, describes a method of controlling the actuator of a microvalve. In the disclosed method, a controller supplies an initial voltage to the actuator which is effective to actuate the microvalve. Then, the controller provides a pulsed voltage to the actuator which is effective to continue the actuation of the microvalve.

Conventional gas ranges and gas ovens use fluid control valves to control the flow of process gas or propane to one or more burners on a stovetop and in an oven, respectively. These conventional gas ranges and ovens require precise flame or temperature control and a positive shut-off function in the flow control valve to prevent an unwanted and potentially hazardous flow of process gas or propane when the gas range or oven burners are in an off position and wherein gas pressure is about 0.5 psi or lower. Additionally, the process of controlling the flow of fluid, such as process gas in silicon fabrication, such as in the fabrication of silicon wafers for MEMS microvalves, microchips, and the like, also requires a positive shut-off function to prevent defects in the fabrication process.

Conventional MEMS microvalves are known to provide very accurate fluid flow control, but typically experience a small amount of fluid leakage during normal operation, and are therefore unsuitable as a stand-alone flow control valve for use in a gas range application.

It would therefore be desirable to provide a two-stage fluid control valve that includes a first stage electronically switchable, bi-stable two-port valve configured to control fluid flow to a second stage microvalve.

SUMMARY OF THE INVENTION

This invention relates to a structure for a two-stage fluid control valve configured as a gas burner control valve that has an improved positive shut-off function. In one embodiment, the two-stage fluid control valve includes a two-stage fluid control valve having a first stage electronically switchable, bi-stable two-port valve movable between an open position and a leak-free closed position, and a second stage microvalve configured to control the flow of fluid through a fluid outlet of the two-stage fluid control valve when the first stage electronically switchable, bi-stable two-port valve is in the open position. The electronically switchable, bi-stable two-port valve is disposed between the second stage microvalve and a fluid inlet of the two-stage fluid control valve.

In another embodiment, a method of controlling a two-stage fluid control valve includes providing a first stage electronically switchable, bi-stable two-port valve movable between an open position and a leak-free closed position and providing a second stage microvalve configured to control the flow of fluid through a fluid outlet of the two-stage fluid control valve when the first stage electronically switchable, bi-stable two-port valve is in the open position. The electronically switchable, bi-stable two-port valve is disposed between the second stage microvalve and a fluid inlet of the two-stage fluid control valve, has a sleeve, a first pole piece having fluid flow passages formed therethrough and a first wire-wound coil mounted therein and connected to a source of electrical power, a second pole piece having fluid flow passages formed therethrough, and a second wire-wound coil mounted therein and connected to the source of electrical power, and wherein the first pole piece is mounted in a first end of the sleeve and the second pole piece is mounted in a second end of the sleeve, and a permanent magnet defining an armature and movably mounted between the first and second pole pieces. An electric current is applied to the first wire-wound coil to magnetize the first pole piece, thus causing the armature to move toward the first pole piece and to the open position. The electric current is removed from the first wire-wound coil, and an electric current is subsequently applied to the second wire-wound coil to magnetize the second pole piece, thus causing the armature to move toward the second pole piece and to the closed position.

In an additional embodiment, a method of controlling a two-stage fluid control valve includes providing a first stage electronically switchable, bi-stable two-port valve movable between an open position and a leak-free closed position and providing a second stage microvalve configured to control the flow of fluid through a fluid outlet of the two-stage fluid control valve when the first stage electronically switchable, bi-stable two-port valve is in the open position. The electronically switchable, bi-stable two-port valve is disposed between the second stage microvalve and a fluid inlet of the two-stage fluid control valve, has a sleeve, a first pole piece having fluid flow passages formed therethrough and a first wire-wound coil mounted therein and connected to a source of electrical power, a second pole piece having fluid flow passages formed therethrough, and a second wire-wound coil mounted therein and connected to the source of electrical power, and wherein the first pole piece is mounted in a first end of the sleeve and the second pole piece is mounted in a second end of the sleeve, and a permanent magnet defining an armature and movably mounted between the first and second pole pieces. An electric current is briefly and simultaneously applied to the first wire-wound coil and the second wire-wound coil such that the electric current flows in a clockwise direction in one of the first and the second wire-wound coils and in a counterclockwise direction in the other of the first and the second wire-wound coils, thus causing the armature to move alternately between the open and closed positions each time the electric current is applied. The brief and simultaneous application of electric current to the first wire-wound coil and the second wire-wound coil is repeated.

In a further embodiment, a method of controlling a two-stage fluid control valve includes providing a first stage electronically switchable, bi-stable two-port valve movable between an open position and a leak-free closed position and providing a second stage microvalve configured to control the flow of fluid through a fluid outlet of the two-stage fluid control valve when the first stage electronically switchable, bi-stable two-port valve is in the open position. The electronically switchable, bi-stable two-port valve is disposed between the second stage microvalve and a fluid inlet of the two-stage fluid control valve, has a sleeve, a first pole piece having fluid flow passages formed therethrough and a first wire-wound coil mounted therein and connected to a source of electrical power, a second pole piece having fluid flow passages formed therethrough, and a second wire-wound coil mounted therein and connected to the source of electrical power, and wherein the first pole piece is mounted in a first end of the sleeve and the second pole piece is mounted in a second end of the sleeve, and a permanent magnet defining an armature and movably mounted between the first and second pole pieces. An electric current is briefly and simultaneously applied to the first wire-wound coil and the second wire-wound coil such that the electric current flows in the same direction in each of the first wire-wound coil and the second wire-wound coil, thus causing the armature to move alternately between the open and closed positions each time the electric current is applied. The brief and simultaneous application of electric current the same direction to the first wire-wound coil and the second wire-wound coil is repeated.

Various aspects of this invention will become apparent to those skilled in the art from the following detailed description of the preferred embodiments, when read in light of the accompanying drawings.

BRIEF DESCRIPTION OF THE DRAWINGS

FIG. 12 is a perspective view of the inner valve body illustrated in FIGS. 2 through 7.

FIG. 13 is a perspective view of the multi-seal member illustrated in FIGS. 3, 4, 6, 7, 9, 10, and 12.

FIG. 20 is a perspective view of the third embodiment of the improved two-stage fluid control valve illustrated in FIGS. 18 and 19.

FIG. 21 is an exploded perspective view of the third embodiment of the improved two-stage fluid control valve illustrated in FIGS. 18 through 20.

DETAILED DESCRIPTION OF THE PREFERRED EMBODIMENTS

Figure 9:
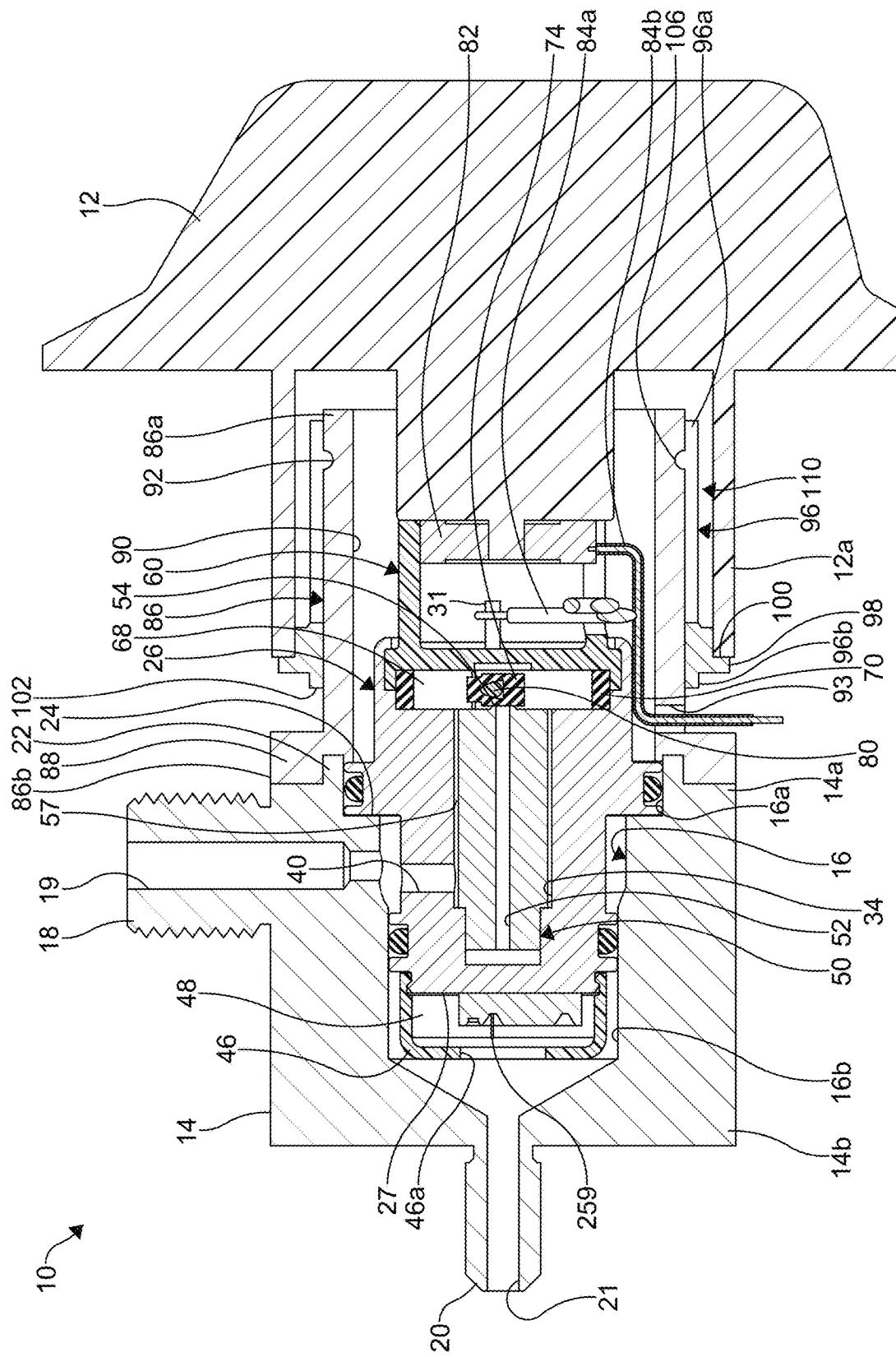
FIG. 9 is a cross-sectional view taken along the line 9-9 of FIG. 8.
Figure 10:
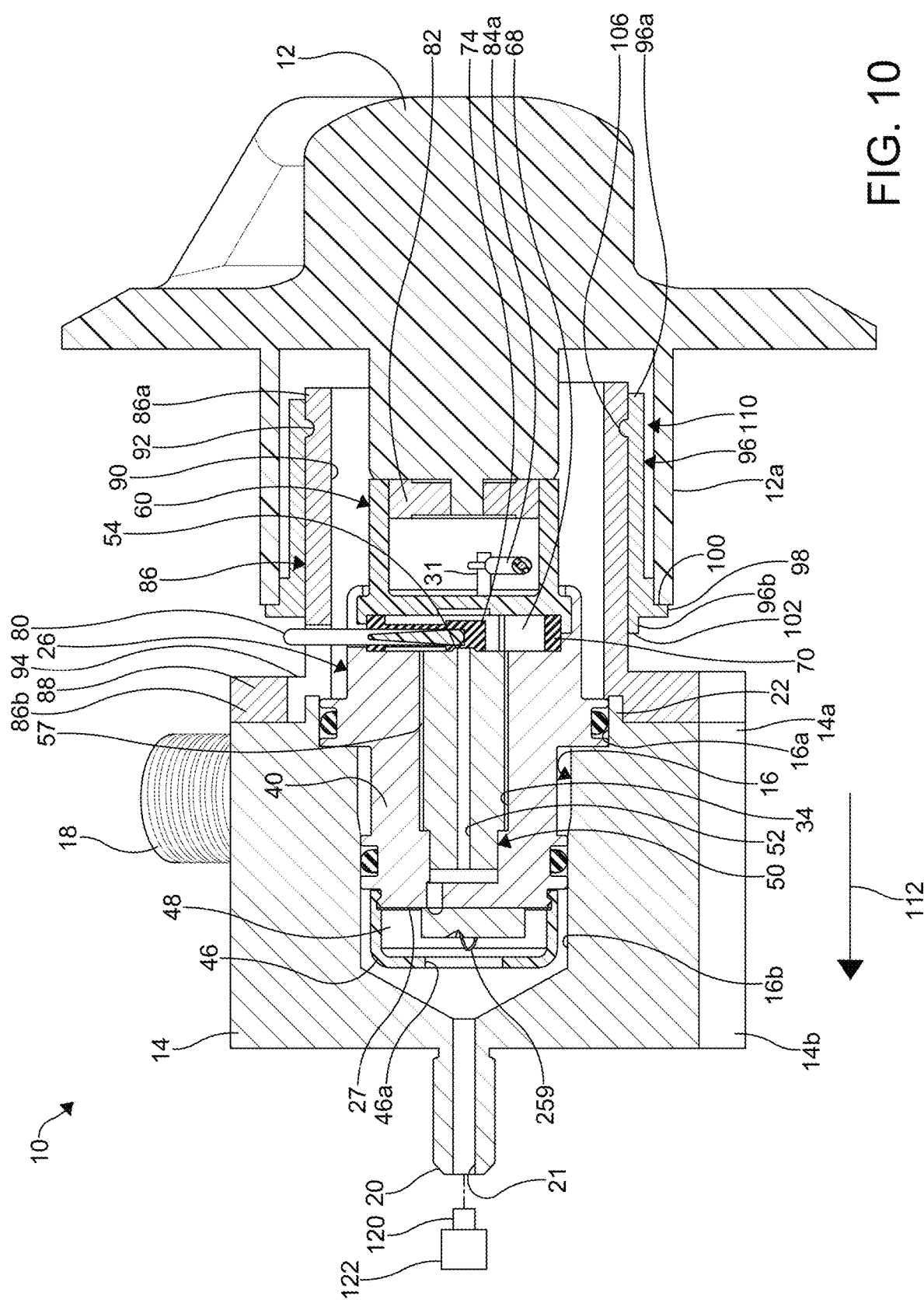
FIG. 10 is a cross-sectional view taken along the line 10-10 of FIG. 8.
Figure 15:
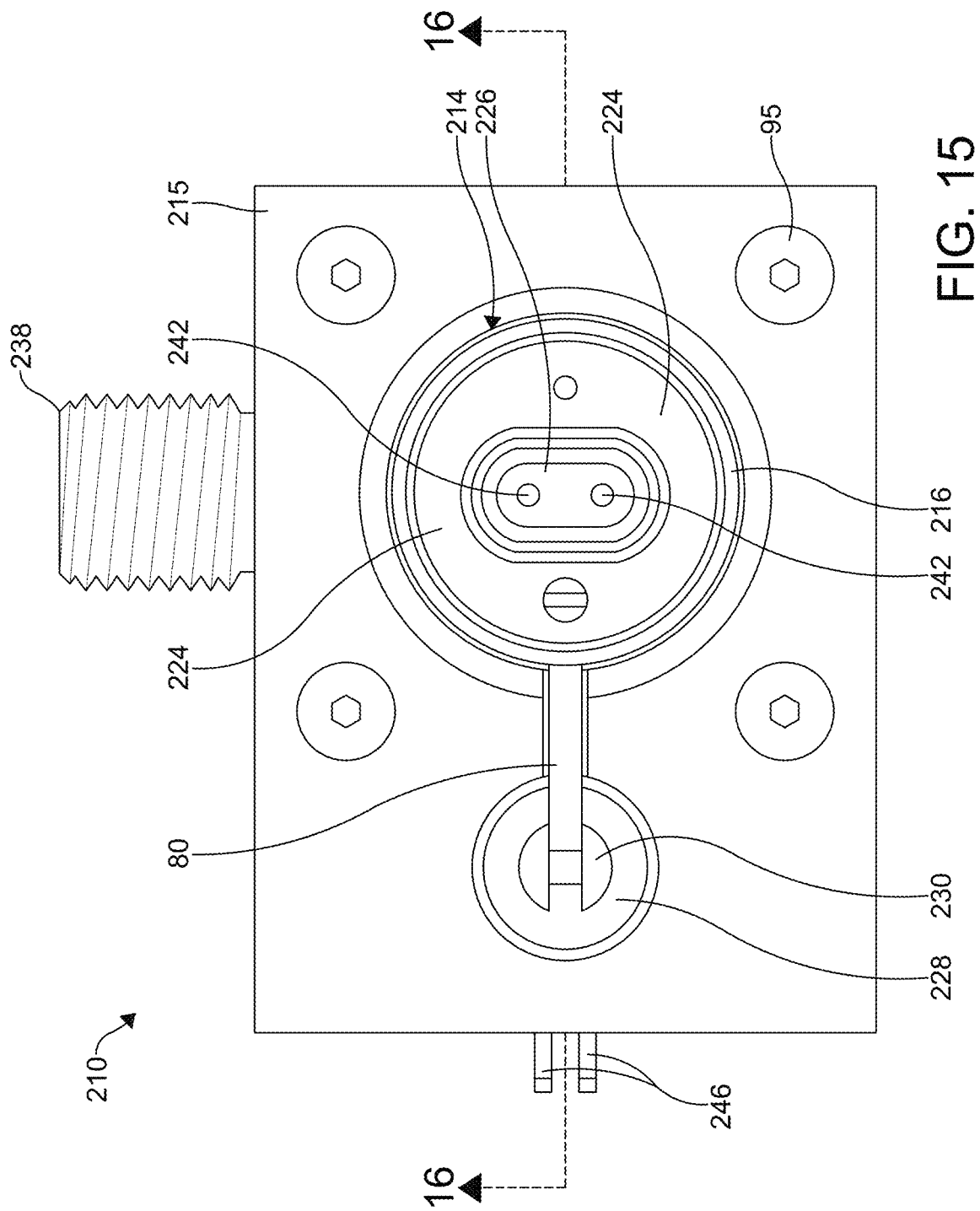
FIG. 15 is an end view of the improved two-stage fluid control valve illustrated in FIG. 14.
Figure 16:
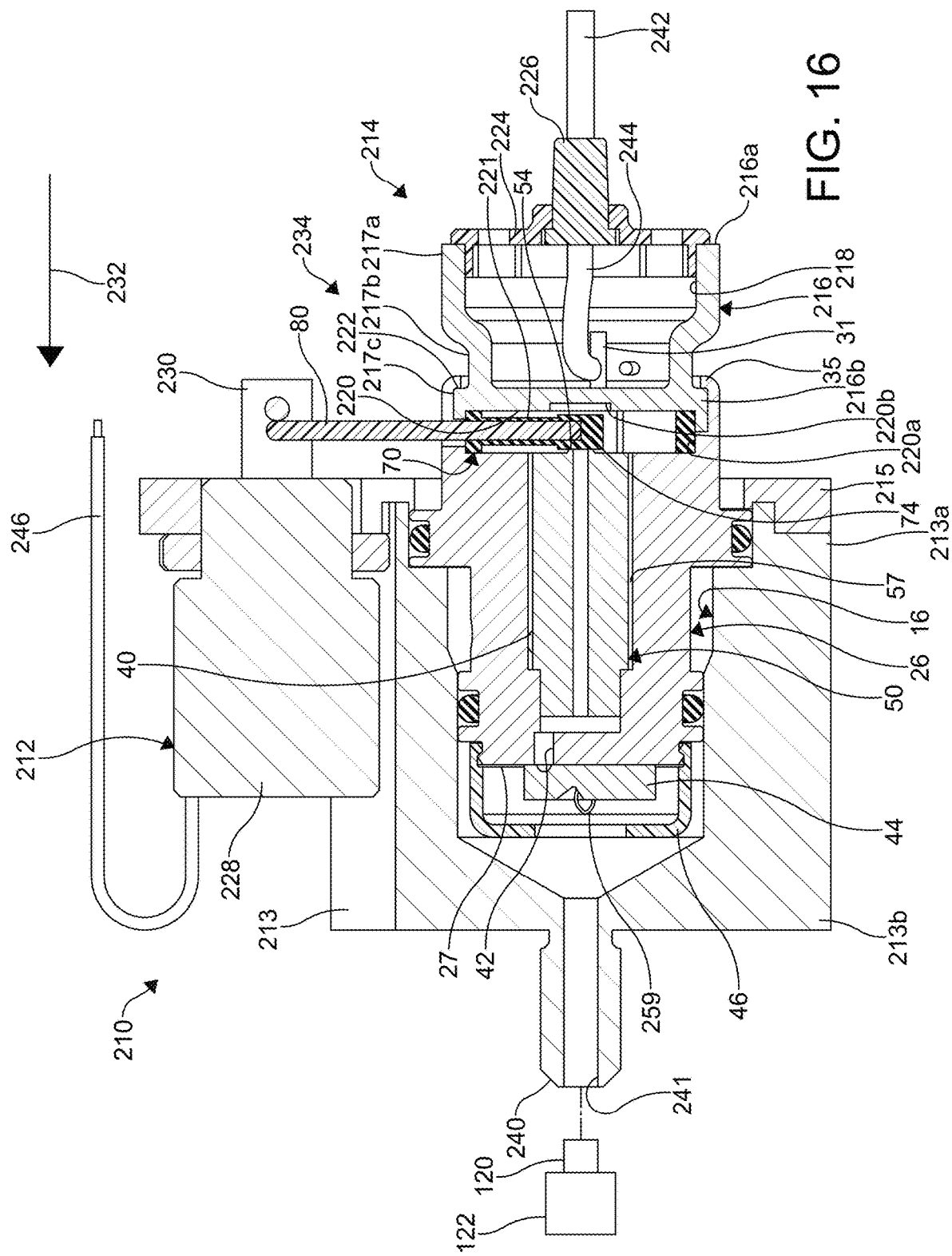
FIG. 16 is a cross-sectional view taken along the line 16-16 of FIG. 15.

This invention relates to an improved structure for a two-stage fluid control valve configured as a burner control valve 10, 210, and 310 for a conventional gas range (not shown) or a gas oven 122 (see FIGS. 10 and 16). In the embodiments illustrated in FIGS. 1 through 17, the burner control valve 10 includes a first stage mechanical valve 110 (see FIGS. 9 and 10) and a second stage microvalve 44, both described in detail below, for use in a system that requires a positive shut-off function, such as a conventional gas range (not shown) or a gas oven 122.

As shown in FIGS. 1 through 9, the burner control valve 10 includes a conventional control knob 12 operatively connected to a first or outer valve body 14. The outer valve body 14 has a substantially rectangular prism shape having a first end 14a and a second end 14b. A substantially cylindrical stepped bore 16 is formed in a first end 14a thereof. The illustrated outer valve body 14 is preferably formed from aluminum. Alternatively, the outer valve body 14 may be formed from any desired metal, metal alloy, and non-metal material, such as plastic. If desired, the outer valve body 14 may be die cast.

A fluid inlet fitting 18 may extend outwardly from the outer valve body 14 and defines a fluid inlet 19. An outlet fitting 20 may extend outwardly from the outer valve body 14 and defines a fluid outlet 21. The fluid inlet 19 and the fluid outlet 21 are in fluid communication with the bore 16. If desired, the inlet and outlet fittings 18 and 20, respectively, may be attached to the outer valve body 14 by a threaded connection. Additionally, the inlet and outlet fittings 18 and 20 may have external threads.

As shown in FIGS. 9 and 10, an annular wall 22 extends outwardly from a surface of the first end 14a of the outer valve body 14 about a first end of the bore 16. A shoulder 24 is defined between a first diameter portion 16a and a second diameter portion 16b of the bore 16, wherein the first diameter portion 16a is larger than the second diameter portion 16b.

Figure 1:
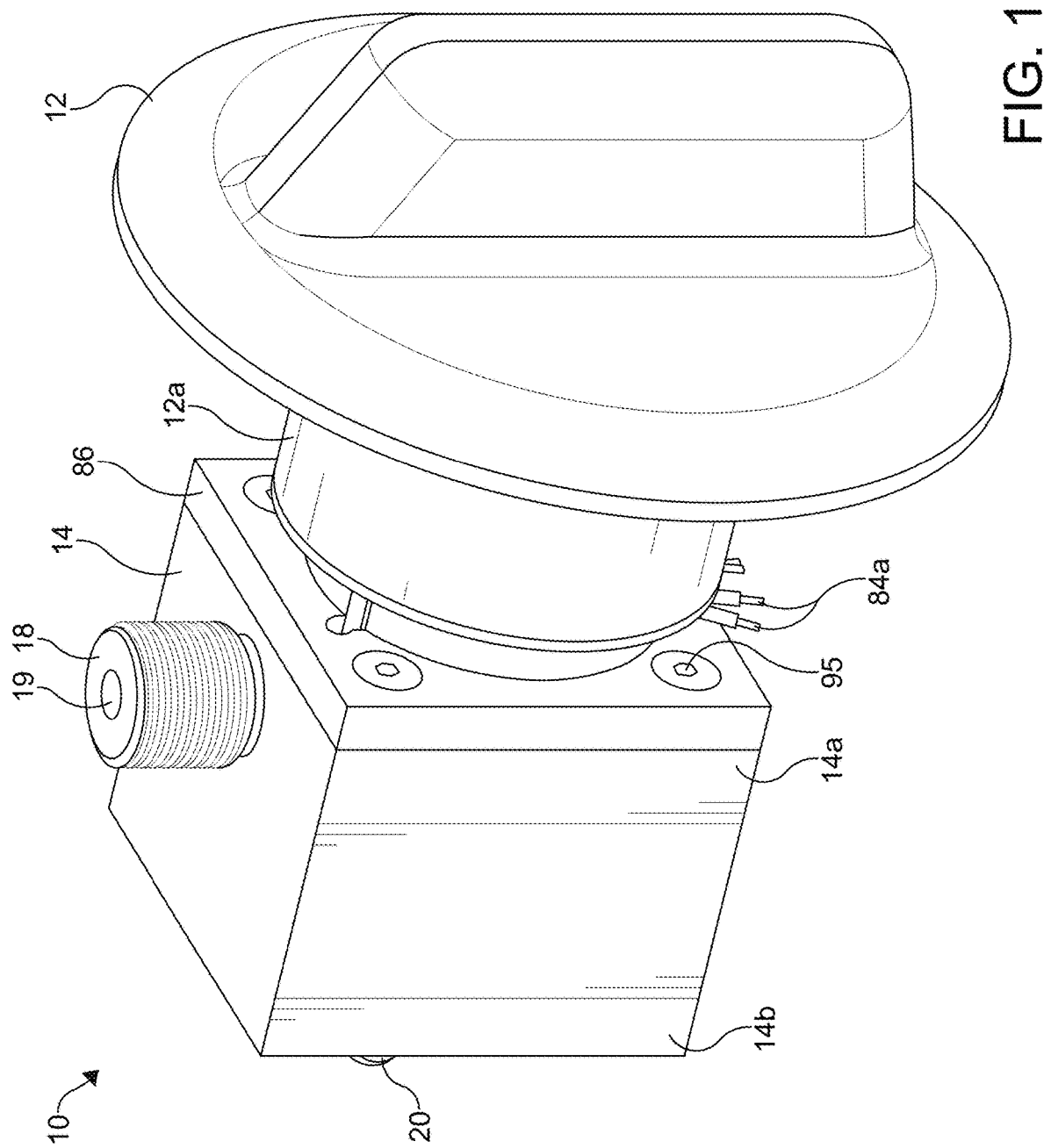
FIG. 1 is a perspective view of a first embodiment of an improved two-stage fluid control valve in accordance with this invention.
Figure 2:
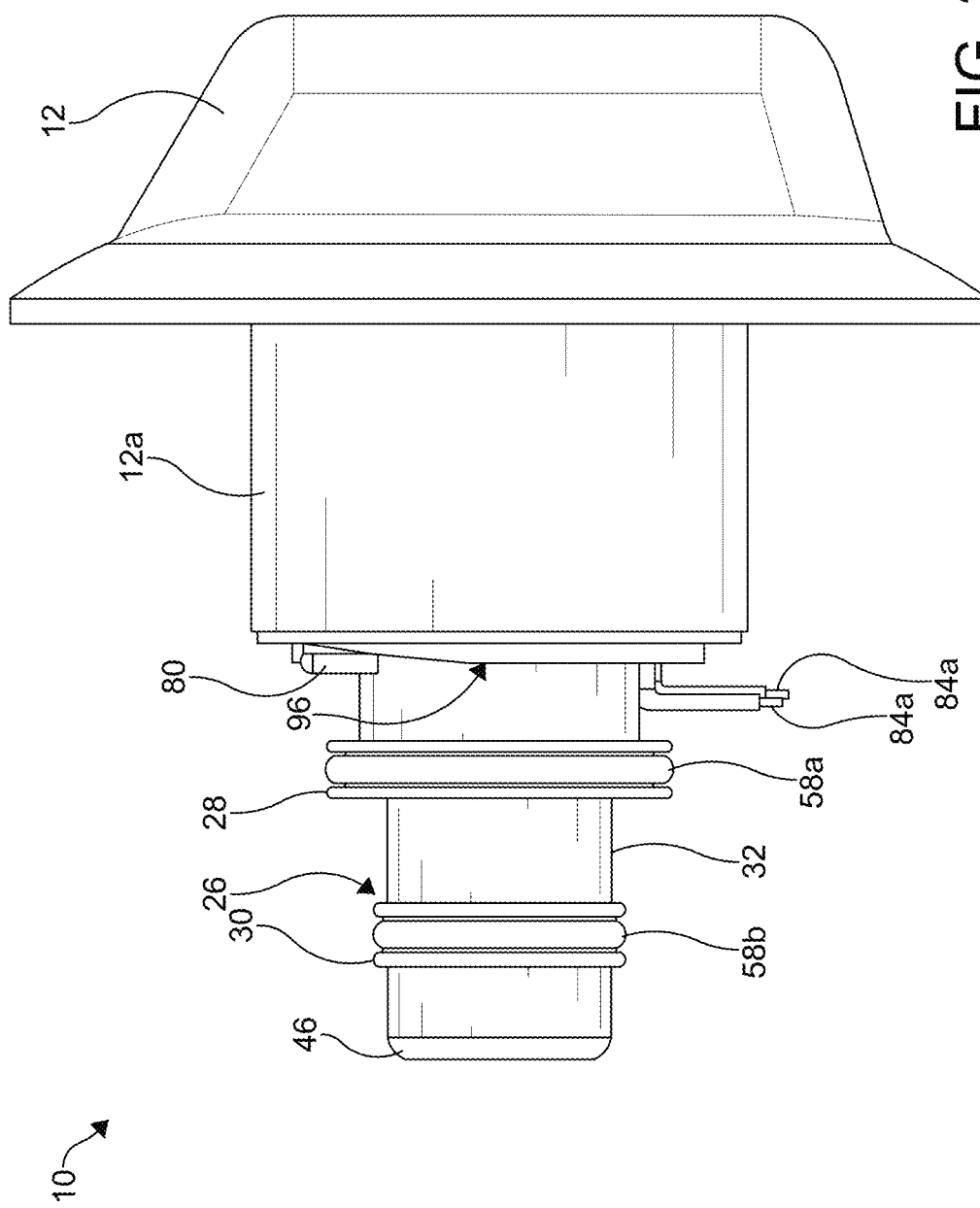
FIG. 2 is a side view of the improved two-stage fluid control valve illustrated in FIG. 1 shown with the valve body removed.
Figure 3:
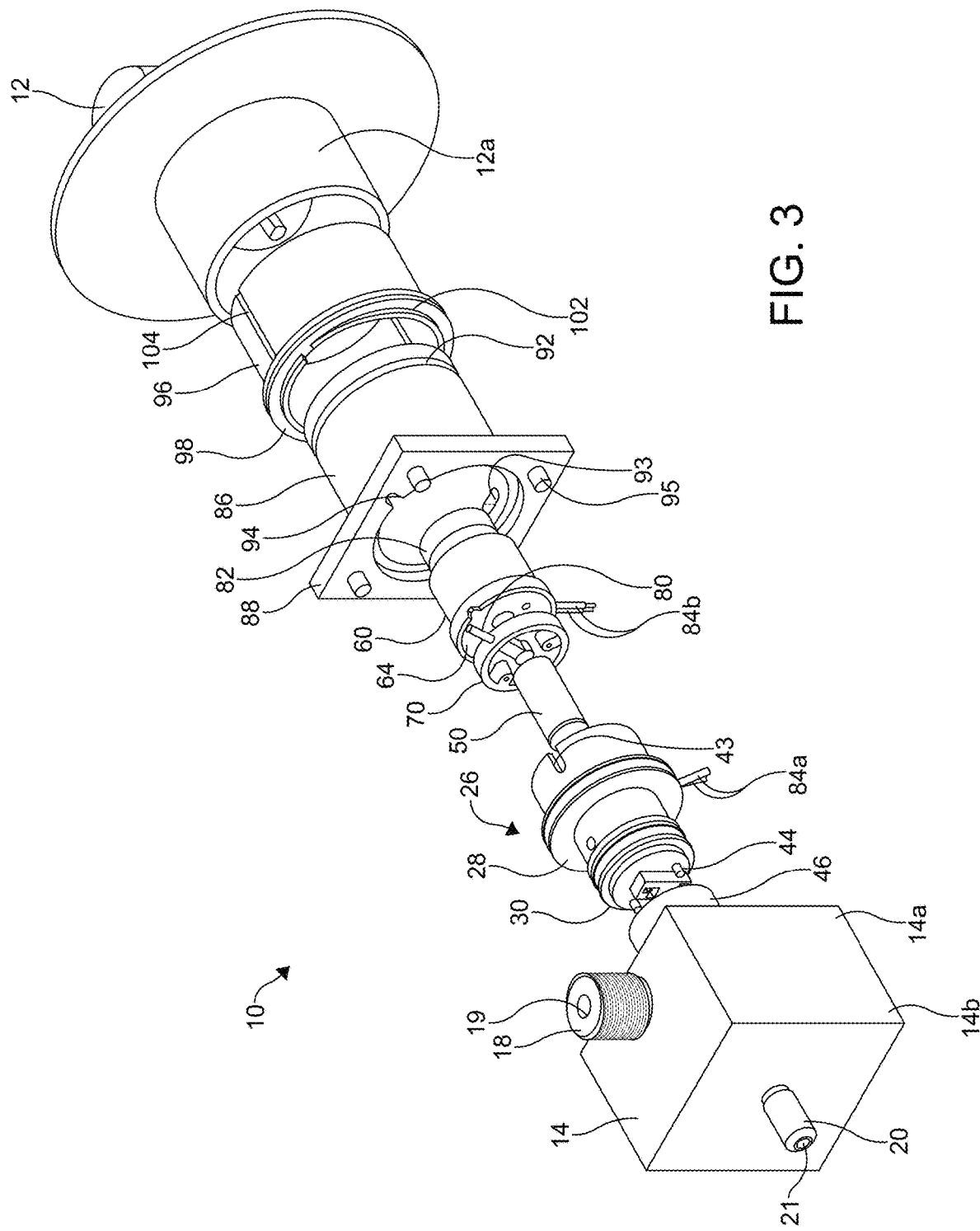
FIG. 3 is an exploded perspective view of the improved two-stage fluid control valve illustrated in FIG. 1.
Figure 4:
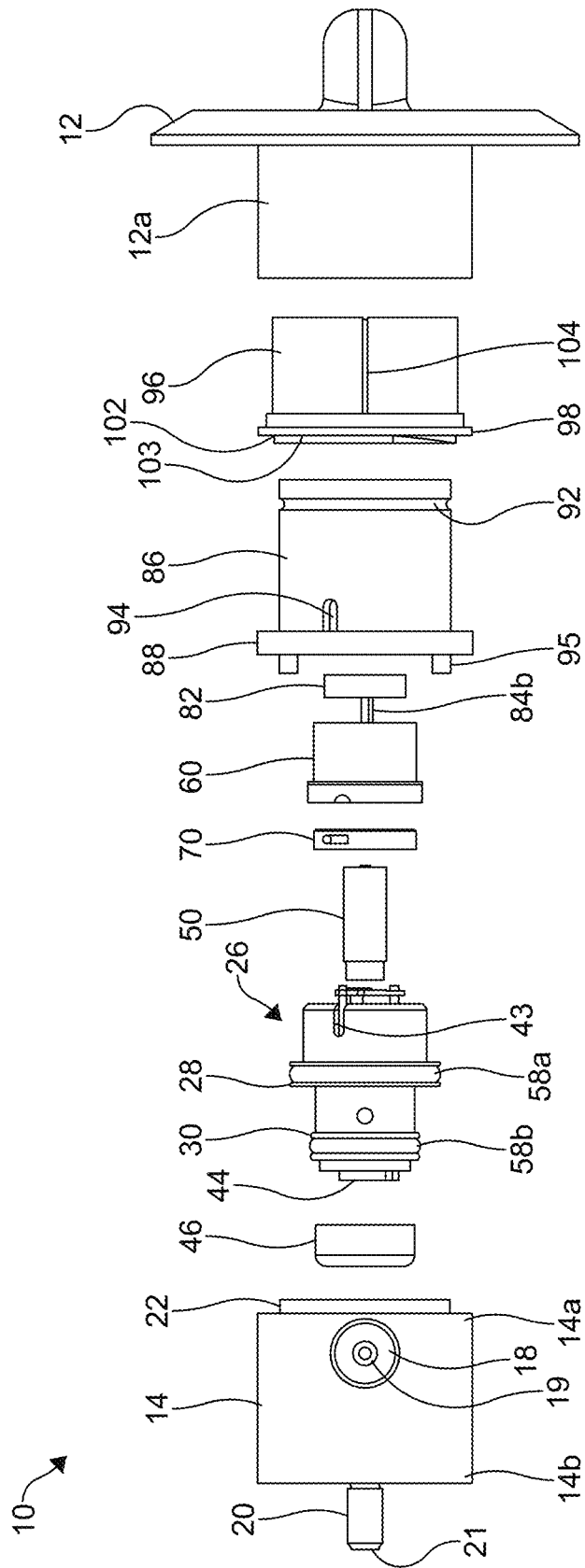
FIG. 4 is an exploded elevational view of the improved two-stage fluid control valve illustrated in FIG. 1.
Figure 5:
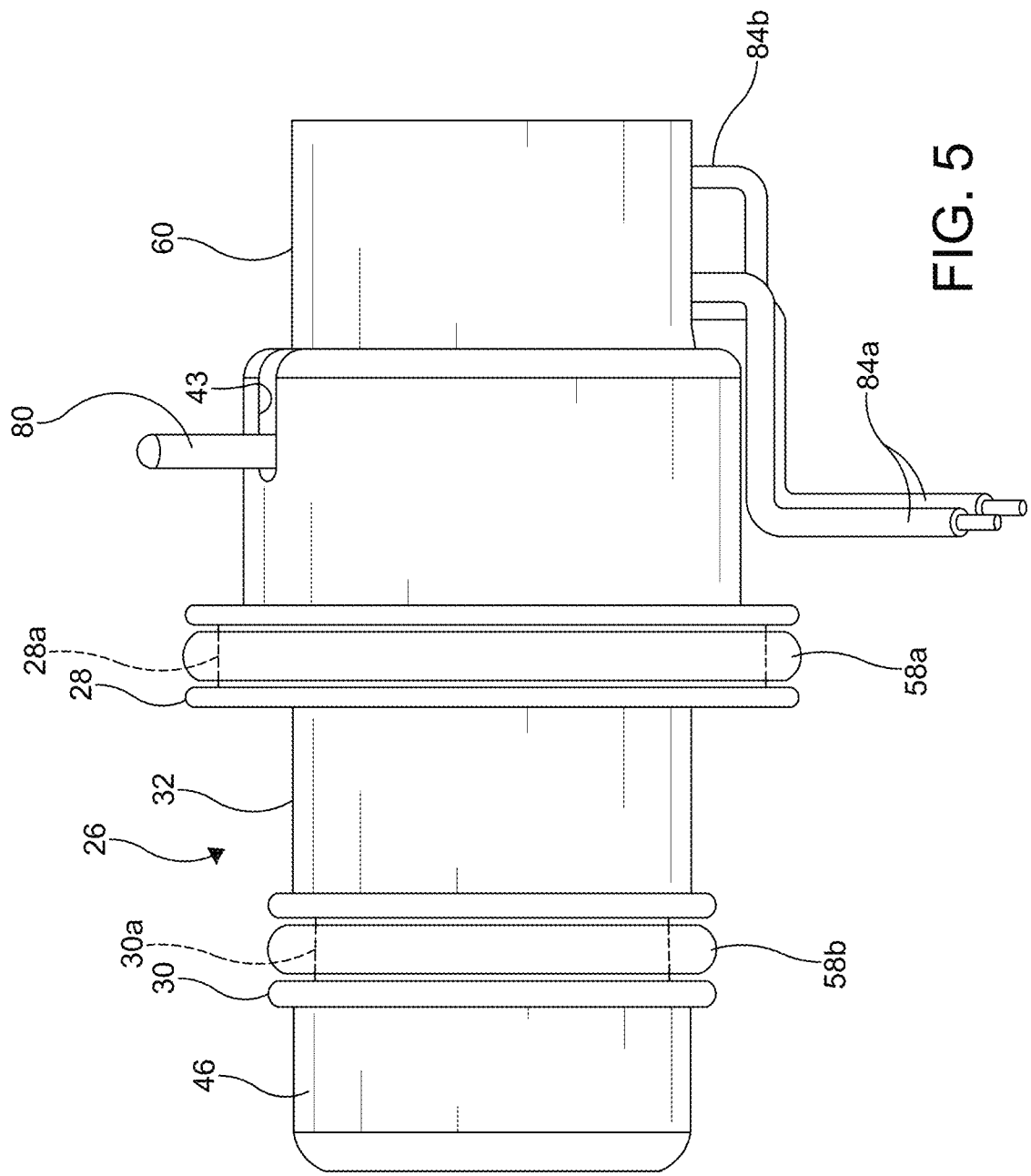
FIG. 5 is an enlarged elevational view of the inner valve body illustrated in FIGS. 2 through 4.
Figure 5A:
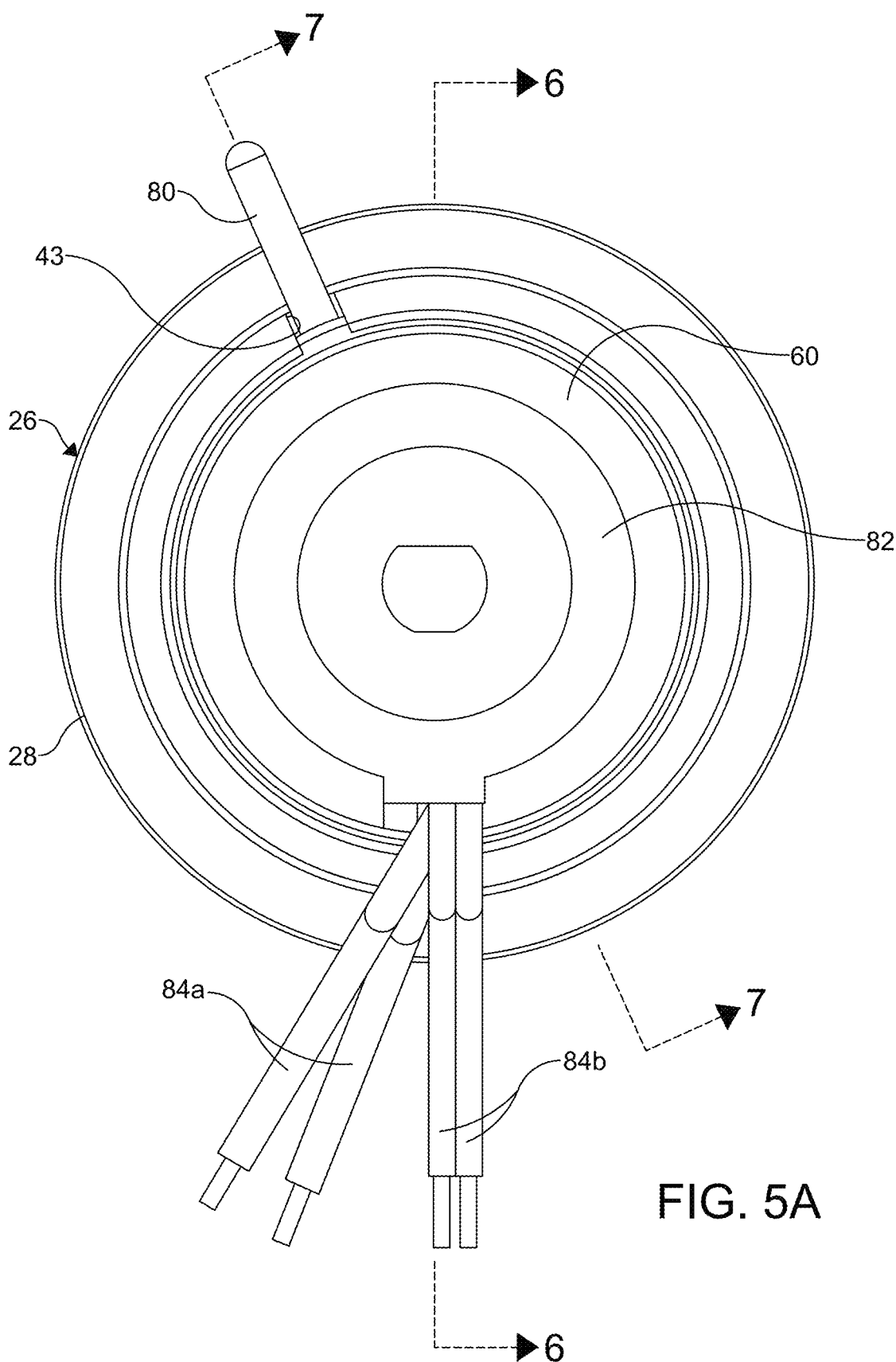
FIG. 5A is an end view of a first end of the inner valve body and the cup-shaped cap illustrated in FIGS. 2 through 5.
Figure 5B:
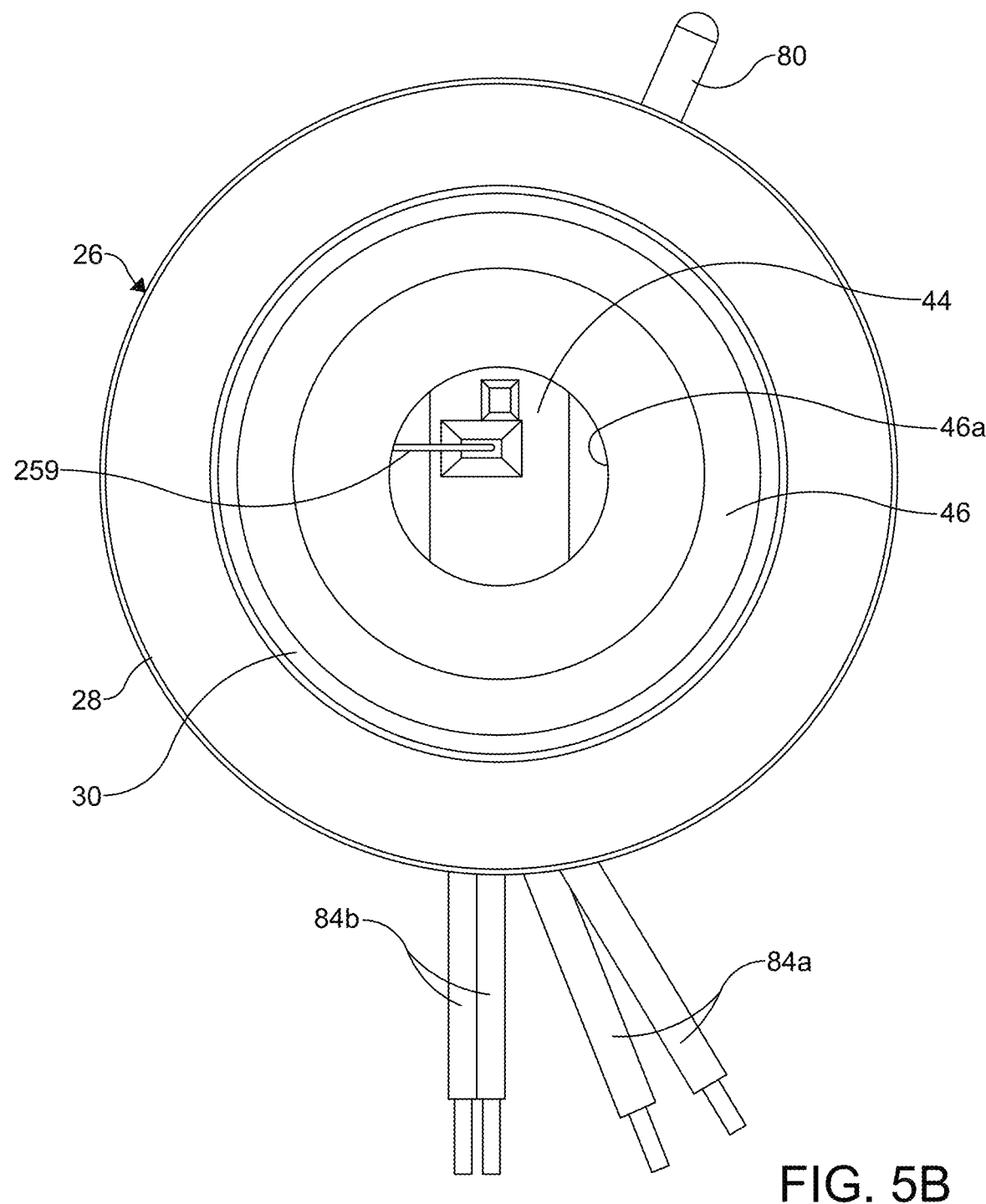
FIG. 5B is an end view of a second end of the inner valve body and the electrical cap illustrated in FIGS. 2 through 5.
Figure 6:
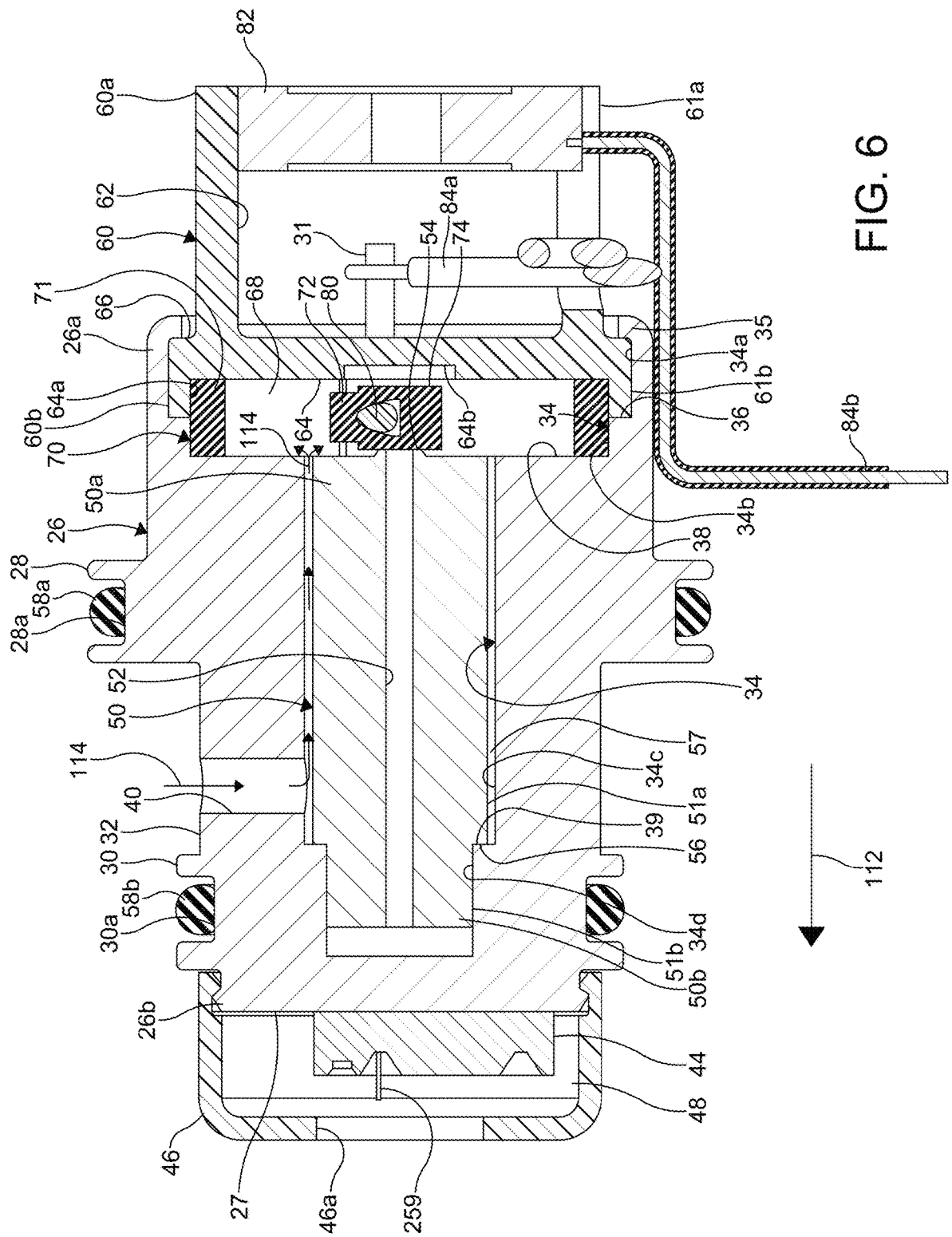
FIG. 6 is a cross-sectional view taken along the line 6-6 of FIG. 5A showing the first stage electronically switchable, bi-stable two-port valve in a closed position.
Figure 7:
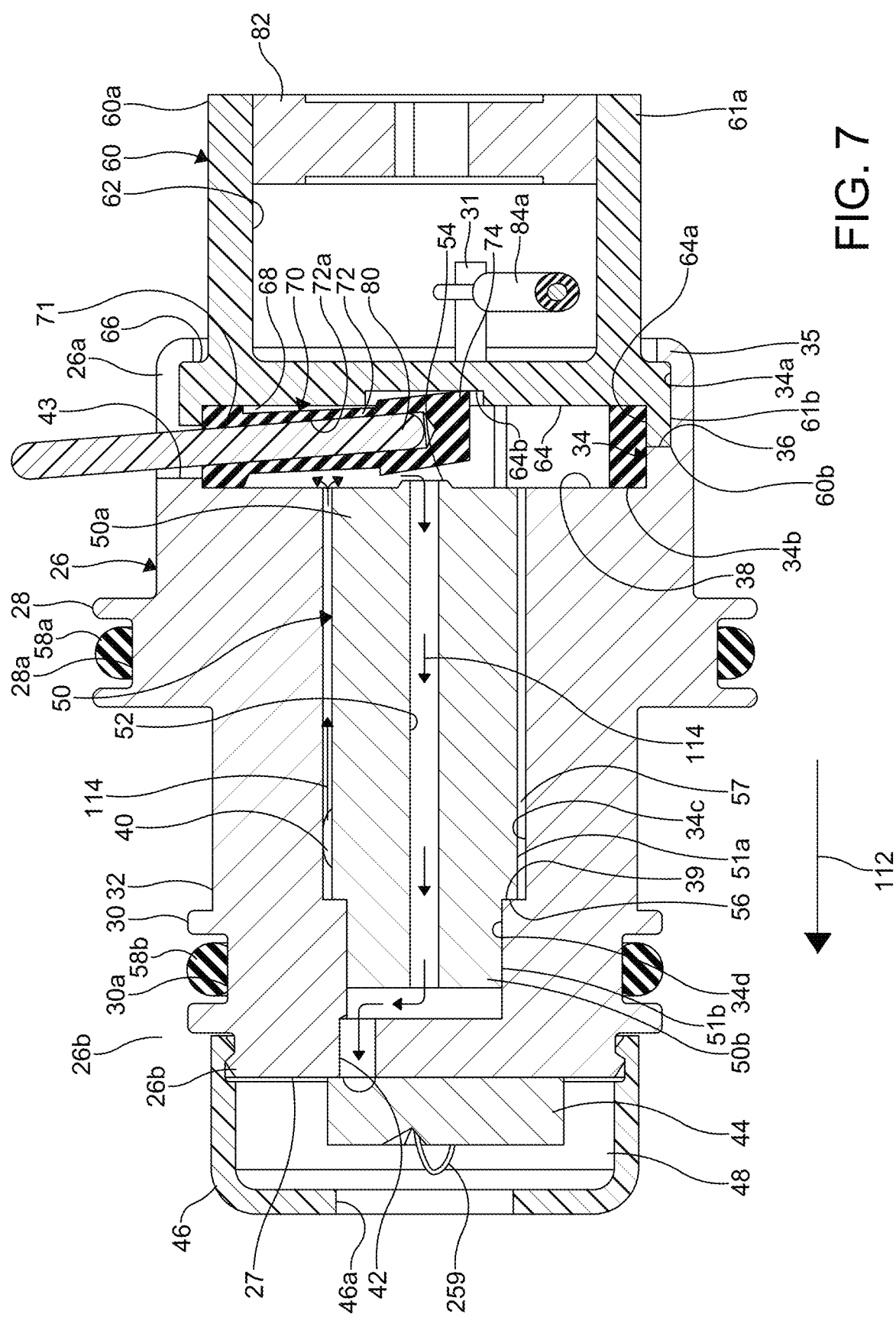
FIG. 7 is a cross-sectional view taken along the line 7-7 of FIG. 5A showing the first stage electronically switchable, bi-stable two-port valve in an open position.
Figure 8:
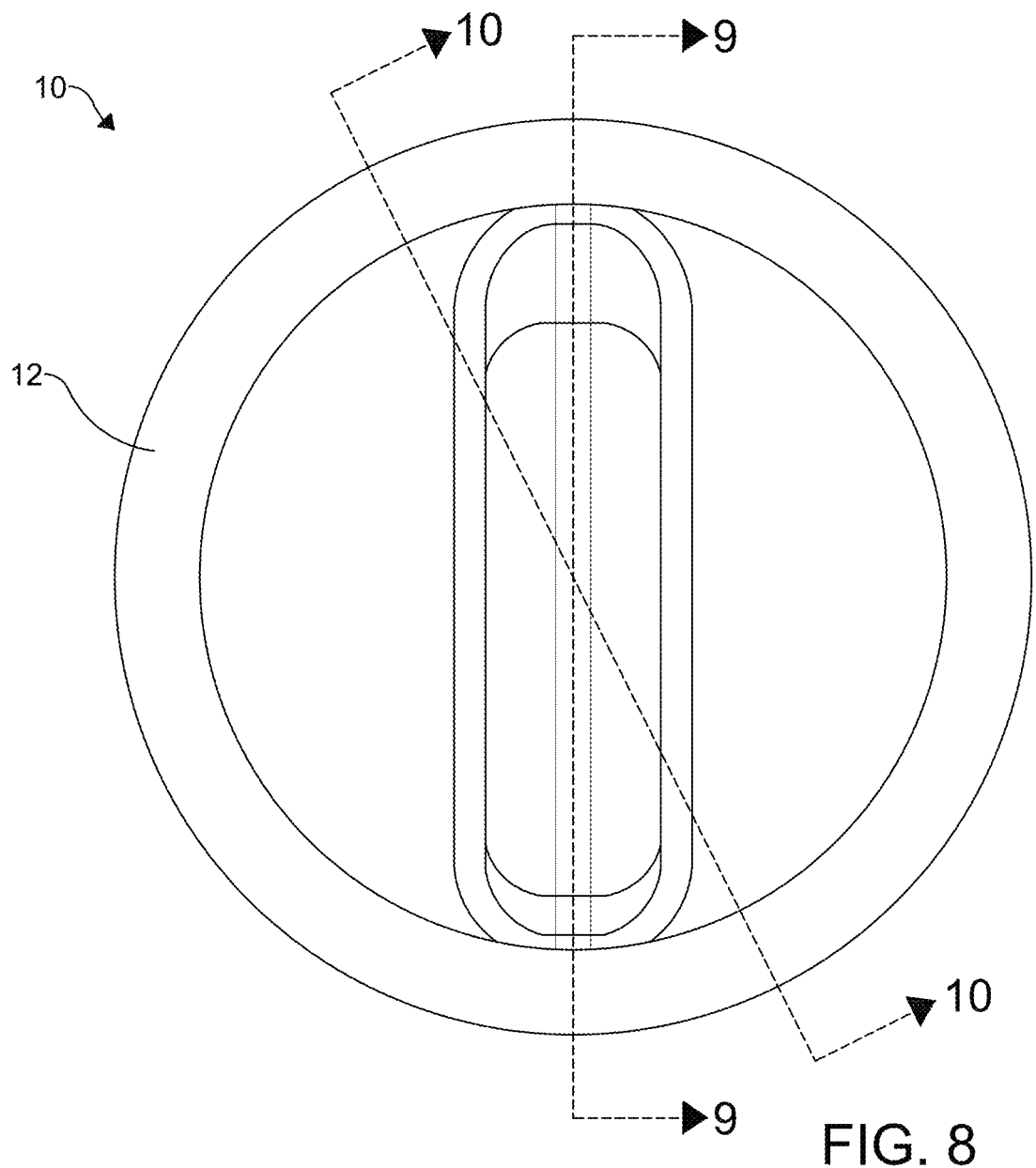
FIG. 8 is an end view of the improved two-stage fluid control valve illustrated in FIGS. 1 through 4.

As best shown in FIGS. 6 and 7, a second or inner valve body 26 is mounted within the bore 16. The inner valve body 26 is substantially cylindrical in shape and defines a housing for a valve seat member 50, and a mounting surface 27 for the microvalve 44, both of which are described below. A first circumferentially extending sealing portion 28 is formed on an outside surface of the inner valve body 26 and defines a first circumferentially extending sealing groove 28a. A second circumferentially extending sealing portion 30 is also formed on an outside surface of the inner valve body 26 and defines a second circumferentially extending sealing groove 30a. A circumferentially extending fluid flow groove 32 is formed in an outside surface of the inner valve body 26 between the first and second sealing portions 28 and 30.

A first annular seal 58a, such as an O-ring, may be disposed within the first circumferentially extending sealing groove 28a. Similarly, a second annular seal 58b, such as an O-ring, may be disposed within the second circumferentially extending sealing groove 30a.

Electrical connectors, such as posts or pins 31, extend between a first end 26a of the inner valve body 26 and the mounting surface 27 at a second end 26b of the inner valve body 26. Electrical connectors, such as wires 84a, extend from the pins 31 extending outwardly from the first end 26a of the inner valve body 26, and electrically connect the pins 31 to a source of electrical power (not shown).

A substantially cylindrical stepped bore 34 is formed in a first end 26a of the inner valve body 26. A radially inwardly and circumferentially extending flange 35 is formed at a first end of the bore 34. A first shoulder 36 is defined between a first diameter portion 34a and a second diameter portion 34b of the bore 34, wherein the first diameter portion 34a is larger than the second diameter portion 34b. A second shoulder 38 is defined between the second diameter portion 34b and a third diameter portion 34c of the bore 34, wherein the second diameter portion 34b is larger than the third diameter portion 34c. A third shoulder 39 is defined between the third diameter portion 34c and a fourth diameter portion 34d of the bore 34, wherein the third diameter portion 34c is larger than the fourth diameter portion 34d. A transverse fluid passageway 40 (see FIG. 6) is formed through a side wall of the inner valve body 26 between the circumferentially extending groove 32 and the third diameter portion 34c of the bore 34.

An axially extending fluid passageway 42 (see FIG. 7) is formed through an end wall of the inner valve body 26 between the fourth diameter portion 34d of the bore 34 and a second end 26b of the inner valve body 26. A transverse actuator pin slot 43 (see FIG. 7) is formed through a side wall of the inner valve body 26 within a seal cavity 68, described below. The microvalve 44 may be mounted to the mounting surface 27 at the second end 26b of the inner valve body 26 by any suitable method, such as with solder. The illustrated inner valve body 26 is preferably formed from steel. Selected portions of the inner valve body 26 may be nickel plated and/or gold plated. Alternatively, the inner valve body may be formed from any desired metal, metal alloy, and non-metal material, and selected portions may be nickel plated, gold plated, and/or plated with other metals and metal alloys.

A generally cup-shaped cap 46 is attached to an outside surface of the inner valve body 26 at the second end 26b thereof. The cap 46 has a substantially cylindrical outer surface and includes an opening 46a in an end wall thereof that defines a flow path for fluid between the microvalve 44 and the fluid outlet 21. An interior of the cap 46 defines a cavity 48 within which the microvalve 44 is mounted. The illustrated cap 46 is preferably formed from glass filled nylon. Alternatively, the cap 46 may be formed from any desired polymer or other material.

The valve seat member 50 is substantially cylindrical, has a first end 50a and a second end 50b, and has an axially extending passageway 52 that extends from the first end 50a to the second end 50b. An annular valve seat 54 extends outwardly from a surface of the first end 50a of the valve seat member 50 about the axially extending passageway 52. The illustrated valve seat member 50 is preferably formed from metal. Alternatively, the valve seat member 50 may be formed from any other desired material, such as metal alloy and non-metal material.

A shoulder 56 is defined between a first outside diameter portion 51a and a second outside diameter portion 51b of the valve seat member 50, wherein the first outside diameter portion 51a is larger than the second outside diameter portion 51b. The valve seat member 50 is mounted within the bore 34 such that the shoulder 56 on the valve seat member 50 engages the third shoulder 39 of the bore 34. In the illustrated embodiment, the valve seat member 50 is press-fit within the fourth diameter portion 34d of the bore 34. Additionally, an annular fluid passageway 57 is formed between the third diameter portion 34c of the bore 34 and the first outside diameter portion 51a of the valve seat member 50.

A substantially cylindrical electrical cap 60 is attached to the inner valve body 26 at the first end 26a thereof. The electrical cap 60 has a first end 60a and a second end 60b, and an electrical chamber 62 formed in the first end 60a thereof. A cap seal cavity 64 is formed in the second end 60b of the electrical cap 60 and includes a substantially cylindrical first cavity portion 64a and a substantially cylindrical second cavity portion 64b centrally formed in a surface of the first cavity portion 64a. A plurality of pin holes (not shown) is formed through the second end 60b of the electrical cap 60, through which the electrical pins 31 extend.

A shoulder 66 is defined between a first outside diameter portion 61a and a second outside diameter portion 61b of the electrical cap 60, wherein the first outside diameter portion 61a is smaller than the second outside diameter portion 61b. The second outside diameter portion 61b of the electrical cap 60 is mounted within the bore 34 of the inner valve body 26 such that the shoulder 66 on the electrical cap 60 engages an inside surface of the flange 35. The seal cavity 68 is defined between the inner valve body 26 and the electrical cap 60. The illustrated electrical cap 60 is preferably formed from plastic. Alternatively, the electrical cap 60 may be formed from any desired material.

A multi-function seal 70 (see FIGS. 6, 7, 12, and 13) is disposed in the seal cavity 68 and includes an annular body 71 and a radially inwardly extending arm 72 terminating in a valve closure member 74. An actuator pin 80 is mounted in an axially extending bore 72a formed in the arm 72 and extends radially outwardly of the multi-function seal 70, and through the transverse actuator pin slot 43 formed through a side wall of the bore 34 within the seal cavity 68. The illustrated multi-function seal 70 also includes a plurality of radially inwardly extending electrical pin tabs 76 having pin apertures 78 formed therein. The illustrated actuator pin 80 is preferably formed from stainless steel. Alternatively, the actuator pin 80 may be formed from any desired metal, metal alloy, and non-metal material.

Advantageously, the multi-function seal 70 provides three fluid-tight seals. First, a fluid-tight seal is provided between the valve closure member 74 and the valve seat 54 of the valve seat member 50. Second, the body 71 provides a fluid-tight seal between the inner valve body 26 and the electrical cap 60. Third, the pin tabs 76 provide fluid-tight seals around the pins 31.

The multi-function seal 70 is preferably formed from an elastomeric material, such as Neoprene, Nitrile, Silicon, EPDM rubber, and the like. Alternatively, the multi-function seal 70 may be formed from any desired elastomeric material.

A position sensor 82 may be mounted in the electrical chamber 62 formed in the first end 60a of the electrical cap 60. Electrical connectors, such as wires 84b, extend from the position sensor 82 and electrically connect the position sensor 82 to a controller (not shown) and to the source of electrical power (not shown). The position sensor 82 may be any desired position sensor configured to detect the rotation of a split sleeve 96, described in detail below.

Referring to FIGS. 9 and 10, a substantially cylindrical valve retainer 86 is attached to the outer valve body 14. The valve retainer 86 has a first end 86a and a second end 86b defining a circumferentially extending and substantially rectangular flange 88, and an axially extending passageway 90 formed therethrough. A circumferentially extending groove 92 is formed on an outside surface of the valve retainer 86 near the first end 86a thereof and a first transverse passageway 93 may be formed through a side wall of the valve retainer 86 through which the wires 84a and 84b extend. A second transverse passageway 94 may also be formed through a side wall of the valve retainer 86 through which the actuator pin 80 extends. The valve retainer 86 may be attached to the outer valve body 14 by any desired means, such as by welding or with threaded fasteners 95. The illustrated valve retainer 86 is preferably formed from aluminum. Alternatively, the valve retainer 86 may be formed from any desired metal, metal alloy, and non-metal material, such as plastic.

Figure 11:
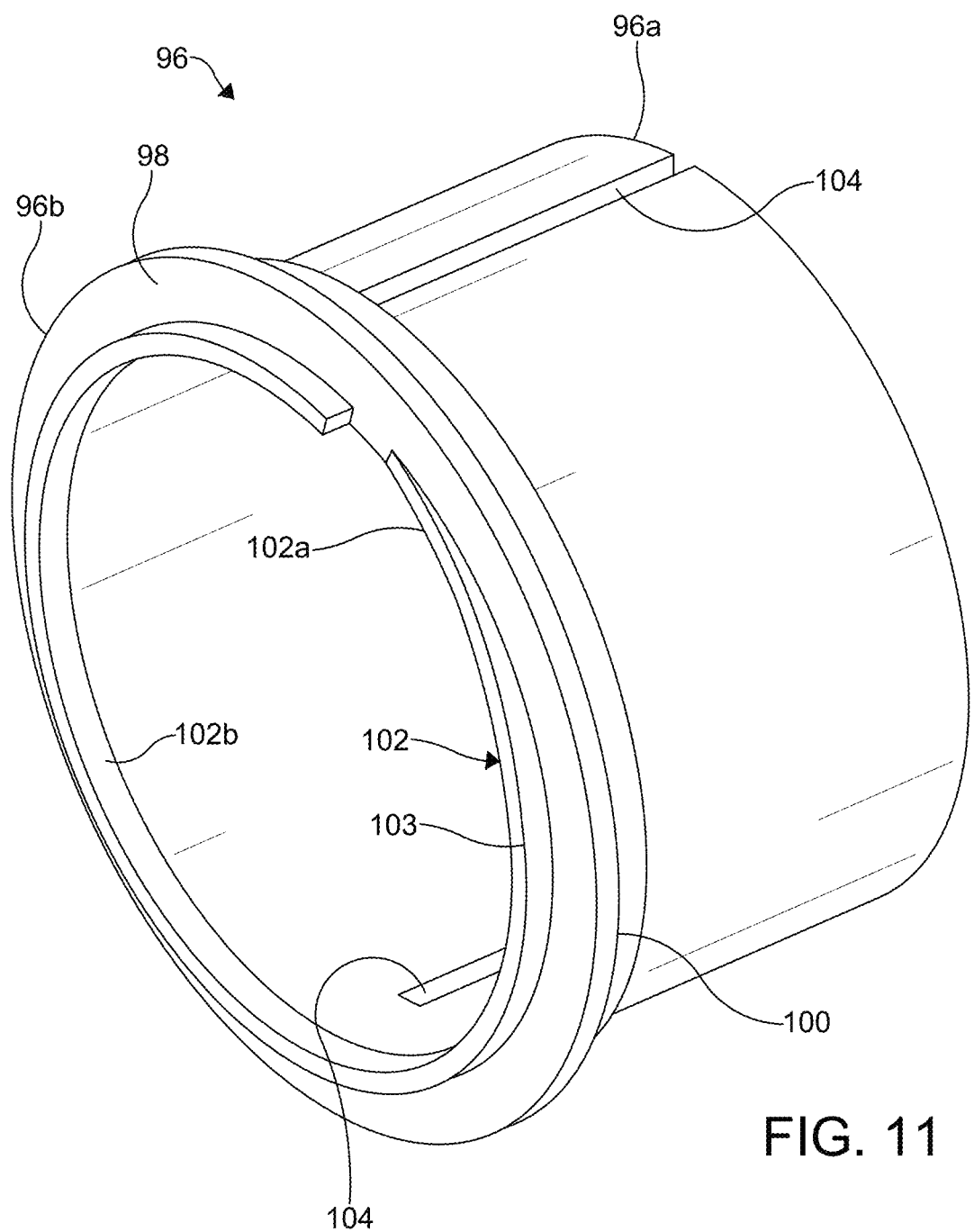
FIG. 11 is a perspective view of the split sleeve illustrated in FIGS. 1-4.

As best shown in FIG. 11, the substantially cylindrical split sleeve 96 includes a first end 96a and a second end 96b defining a circumferentially extending flange 98. The flange 98 is stepped and defines a shoulder 100. An annular cam member or ramp 102 is formed on the flange 98 and extends axially outwardly therefrom. An axial end surface of the ramp 102 defines a cam surface 103. The ramp 102 includes a tapered ramp portion 102a and a second portion 102b having a substantially uniform height from the flange 98. The tapered portion 102a transitions from an axial end surface of the flange 98 to the height of the second portion 102b. One or more axially extending expansion slots 104 are formed in a side wall of the split sleeve 96. A circumferentially and radially inwardly extending ridge 106 may be formed on an inside surface of the side wall of the split sleeve 96 (see FIGS. 9 and 10). The split sleeve 96 is movably mounted about the valve retainer 86 such that the ridge 106 is positioned in the groove 92 formed on the outside surface of the valve retainer 86. The illustrated split sleeve 96 is preferably formed from brass. Alternatively, the split sleeve 96 may be formed from any desired metal, metal alloy, and non-metal material.

The conventional control knob 12 has a collar 12a that is attached about the outside surface of the side wall of the split sleeve 96 such that the collar 12a engages the shoulder 100 of the split sleeve 96 and such that rotational movement of the control knob 12 also moves the split sleeve 96 about the valve retainer 86. The illustrated control knob 12 is preferably formed from plastic. Alternatively, the control knob 12 may be formed from any desired material.

The inner valve body 26, the valve seat member 50, the multi-function seal 70, the valve retainer 86, and the split sleeve 96 combine to define the first stage mechanical valve 110.

In operation, a user may turn the control knob 12 clockwise, which also rotates the attached split sleeve 96 clockwise. The cam surface 103 of the ramp 102 engages the actuator pin 80 and urges the actuator pin 80 toward the outer valve body 14, i.e., in the direction of the arrow 112 (see FIGS. 6, 7, 9, and 10), and thus lifts the valve closure member 74 off of the valve seat 54 allowing gas to flow from the fluid inlet 19, through the transverse fluid passageway 40, the annular fluid passageway 57, the seal cavity 68, the valve seat 54, and through the fluid passageway 42 to the microvalve 44, i.e., in the direction of the arrows 114 (see FIGS. 6 and 7). The microvalve 44 may then be modulated to very precisely control the flow of fluid outwardly through the fluid outlet 21. Significantly, the microvalve 44 additionally provides improved flame control and improved temperature control. For example, the flow of gas through the burner control valve 10 may be controlled to flow within the range of from about 5% to about 100% of a maximum flow rate of the burner control valve 10.

As the control knob 12 and the split sleeve 96 are rotated, the position sensor 82 may detect the movement and send a signal to the controller (not shown). The controller then actuates the microvalve 44, allowing gas to pass therethrough. If desired, the controller may also send a signal to actuate an electronic igniter, if provided, simultaneously with the signal to actuate the microvalve 44.

The first stage mechanical valve 110, and therefore the burner control valve 10, is thus moveable between a closed position as best shown in FIG. 6, wherein no gas is permitted to move through the valve seat 54, and an open position as best shown in FIG. 7, wherein the valve closure member 74 is moved off of the valve seat 54 and gas is permitted to flow through the valve seat 54, to the second stage microvalve 44, through which fluid flow may be very accurately controlled.

The combination of the unique first stage mechanical valve 110 and the second stage microvalve 44 in the burner control valve 10 provides a fluid control valve with an advantageous positive shut-off function. As used herein, a positive shut-off of the first stage mechanical valve 110 is defined as a leak free closed position.

Thus, a microvalve such as the microvalve 44 may be used in two-stage fluid control valves applications where internal valve leakage in not permitted, but where accurate fluid flow control, such as provided by the microvalve 44, is required.

It has been shown that a force of about 0.1 Newton on the actuator pin 80 is sufficient to urge the actuator pin 80 in the direction of the arrow 112, thus lifting the valve closure member 74 off of the valve seat 54 a distance of about 0.4 mm; i.e., the open position.

If desired, a temperature sensor, such as a thermocouple 120, may be mounted in a gas oven 122 as schematically shown in FIG. 10. With the thermocouple 120, the burner control valve 10 may be configured as a closed loop system that may be controlled by a temperature of the gas oven 122 to which the burner control valve 10 is mounted.

Figure 14:
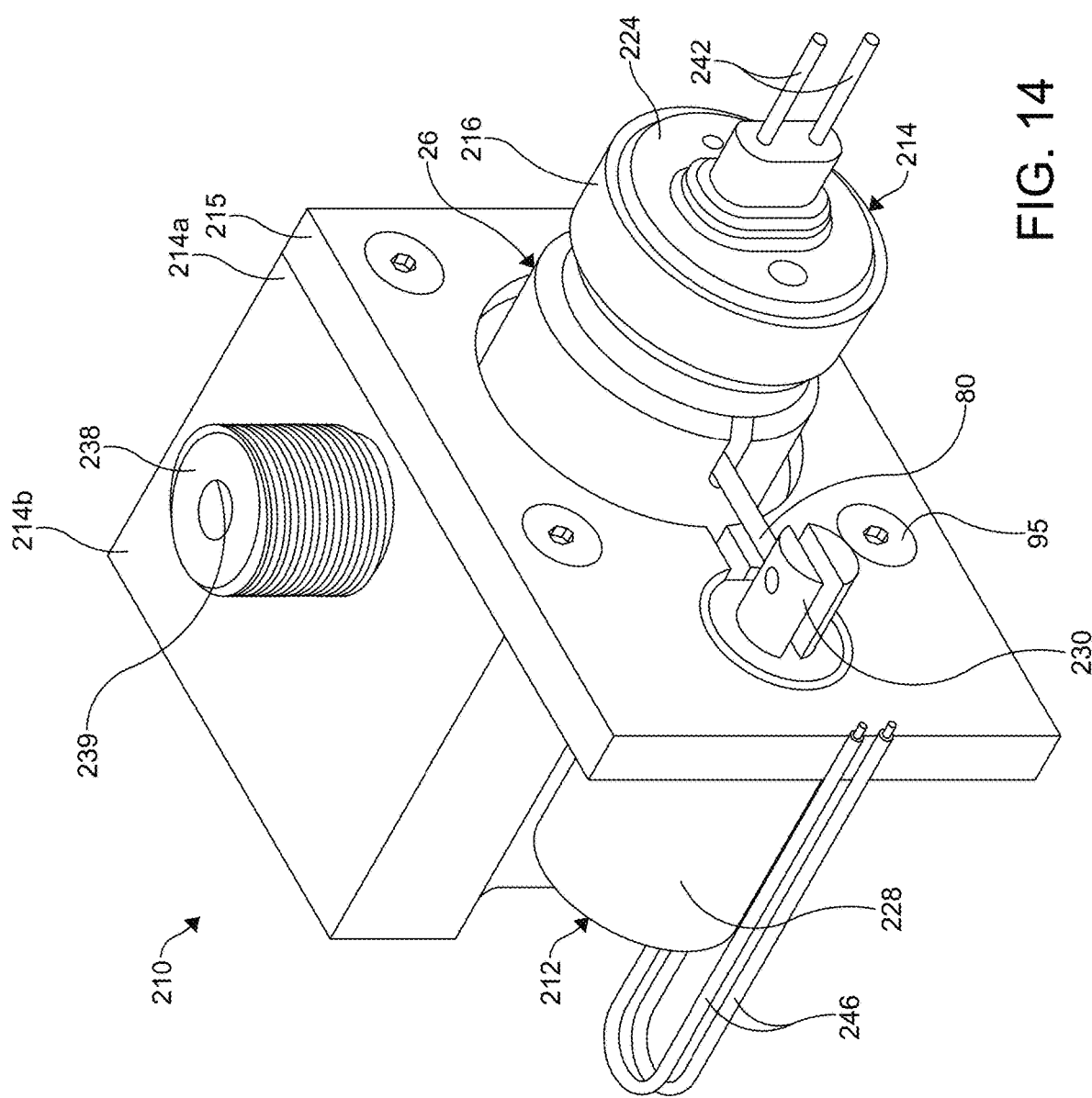
FIG. 14 is a perspective view of a second embodiment of an improved two-stage fluid control valve in accordance with this invention.

Referring now to FIGS. 14 through 16, a second embodiment of the improved fluid control valve is also configured as a burner control valve for a gas range (not shown) or a gas oven 122 and shown at 210. Alternatively, the illustrated burner control valve 210 may be configured for use in other applications, such as for use a gas mass flow controller to control the flow of process gas in a silicon fabrication process. In such an application, fluid pressure at a fluid inlet 239 may be about 90 to 110 psi. Thus, a pressure force acting on the valve closure member 74 seated on the valve seat 54 may be about 1 to 3 Newtons. A corresponding force of greater than about 1 to 3 Newtons is thus required to overcome the fluid pressure at the fluid inlet 239 and to urge the actuator pin 80 off of the valve seat 54.

The burner control valve 210 is similar to the burner control valve 10, but is actuated by a solenoid 212. The burner control valve 210 includes an outer valve body 213 that is substantially similar to the outer valve body 14, has a substantially rectangular prism shape, a first end 213a, and a second end 213b. The substantially cylindrical stepped bore 16 is formed in the first end 213a thereof. A fluid inlet fitting 238 and a fluid outlet fitting 240 may extend outwardly from the outer valve body 213 and define a fluid inlet 239 and a fluid outlet 241, respectively. The fluid inlet 239 and the fluid outlet 241 outlet fitting are in fluid communication with the bore 16. If desired, the inlet and outlet fittings 238 and 240, respectively, may be attached to the outer valve body 213 by a threaded connection. Additionally, the inlet and outlet fittings 238 and 240 may have external threads.

The burner control valve 210 further includes the inner valve body 26, the cap 46, the valve seat member 50, the microvalve 44, and the multi-function seal 70, all described in detail above.

A substantially cylindrical electrical cap assembly 214 includes a cap body 216 having a first end 216a and a second end 216b, and an electrical chamber 218 formed in the first end 216a thereof. A cap seal cavity 220 is formed in the second end 216b of the electrical cap body 216 and includes a substantially cylindrical first cavity portion 220a and a substantially cylindrical second cavity portion 220b centrally formed in a surface of the first cavity portion 220a. A plurality of pin holes (not shown) is formed through the second end 216b of the electrical cap body 216, through which the electrical pins 31 extend.

The cap body 216 includes a first outside diameter portion 217a, a second outside diameter portion 217b, and a third outside diameter portion 217c. A shoulder 222 is defined between the second outside diameter portion 217b and the third outside diameter portion 217c, wherein the second outside diameter portion 217b is smaller than the third outside diameter portion 217c. The third outside diameter portion 217c of the electrical cap body 216 is mounted within the bore 34 of the inner valve body 26 such that the shoulder 222 on the electrical cap body 216 engages an inside surface of the flange 35. The seal cavity 221 is defined between the inner valve body 26 and the electrical cap body 216.

The electrical cap assembly 214 also includes a cap 224 mounted with and closing the first end 216a of the cap body 216. An electrical connector assembly 226 is attached to the cap 224 and to electrical connectors, such as wires 242 that extend from the connector assembly 226 to the source of electrical power (not shown). Wires 244 also extend from the pins to the electrical connector assembly 226.

The solenoid 212 may be attached to the cover plate 215 and includes a solenoid housing 228. A solenoid coil (not shown) may be mounted in a coil housing (not shown) in a conventional manner. An axially moveable plunger 230 is slidably mounted within the coil of the solenoid 212. The plunger 230 extends outwardly of the solenoid 212 and is attached to the actuator pin 80. Electrical connectors, such as the wires 246, extend from the solenoid 212 to the source of electrical power (not shown).

To operate the improved burner control valve 210, a user may actuate the solenoid 212 by engaging an actuator switch (not shown). Upon actuation, the solenoid plunger 230 is urged inwardly into the solenoid 212, thus also urging the attached end of the actuator pin 80 in the direction of the arrow 232 (to the left when viewing FIG. 16. In the manner described above, the valve closure member 74 is thus lifted off of the valve seat 54 allowing gas to flow from the fluid inlet 239, through the transverse fluid passageway 40, the annular fluid passageway 57, the seal cavity 221, the valve seat 54, and through the fluid passageway 42 to the microvalve 44. The microvalve 44 may then be modulated in a known manner to control the flow of fluid outwardly through the fluid outlet 241. As described above, the microvalve 44 additionally provides improved flame control and improved temperature control.

Similar to the burner control valve 10, the inner valve body 26, the valve seat member 50, the multi-function seal 70, and the solenoid 212 of the burner control valve 210 combine to define a first stage mechanical valve 234.

As described above, the burner control valve 210 may be mounted to a gas oven, such as the gas oven 122. The thermocouple 120 may be mounted in the gas oven 122 as schematically shown in FIG. 16. With the thermocouple 120, the burner control valve 210 may be configured as a closed loop system that may be controlled by a temperature of the gas oven 122.

Figure 17:
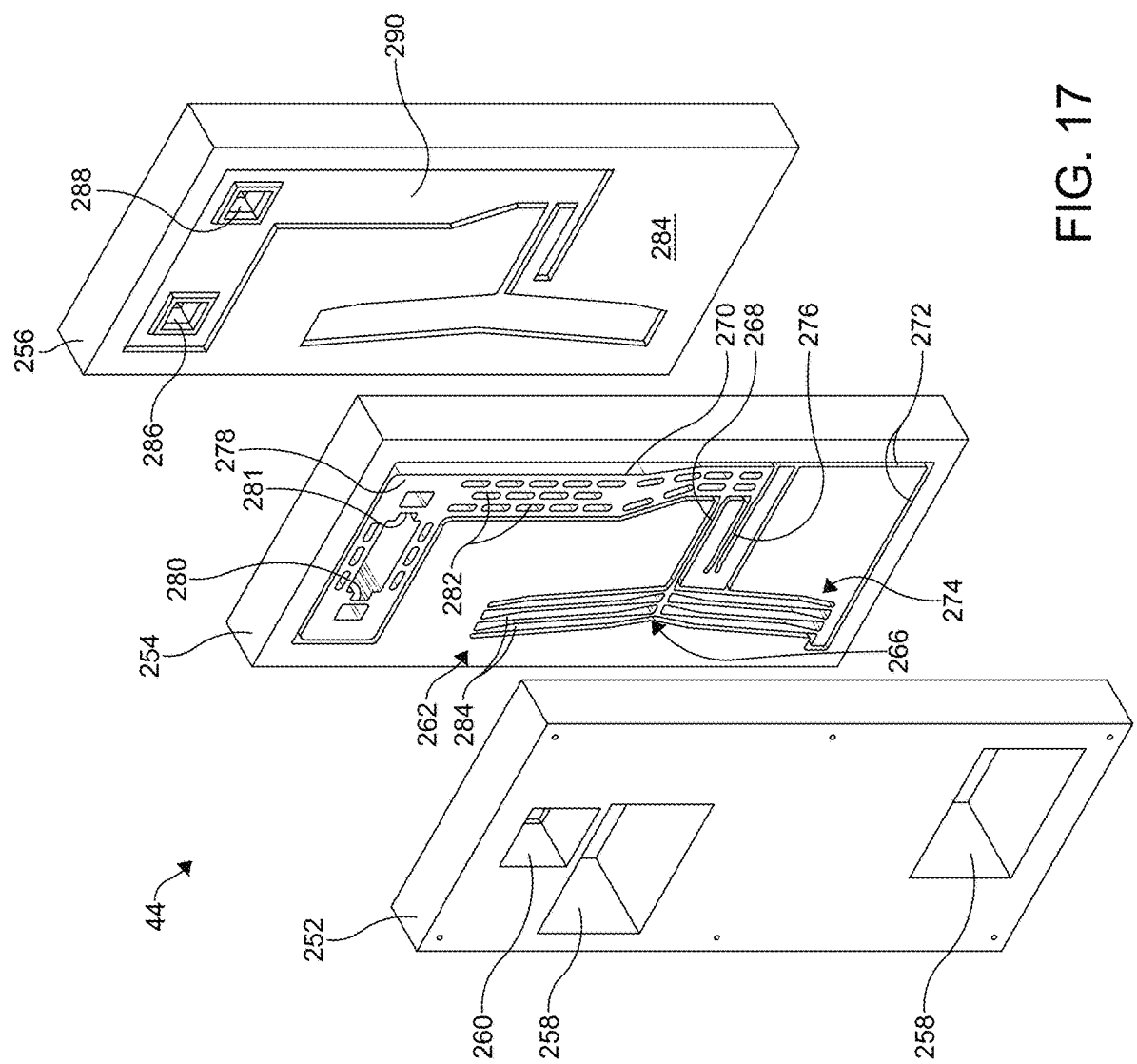
FIG. 17 is a perspective view of a microvalve that may be used in the first and second embodiments of the improved fluid control valves illustrated in FIGS. 1 and 14.
Figure 18:
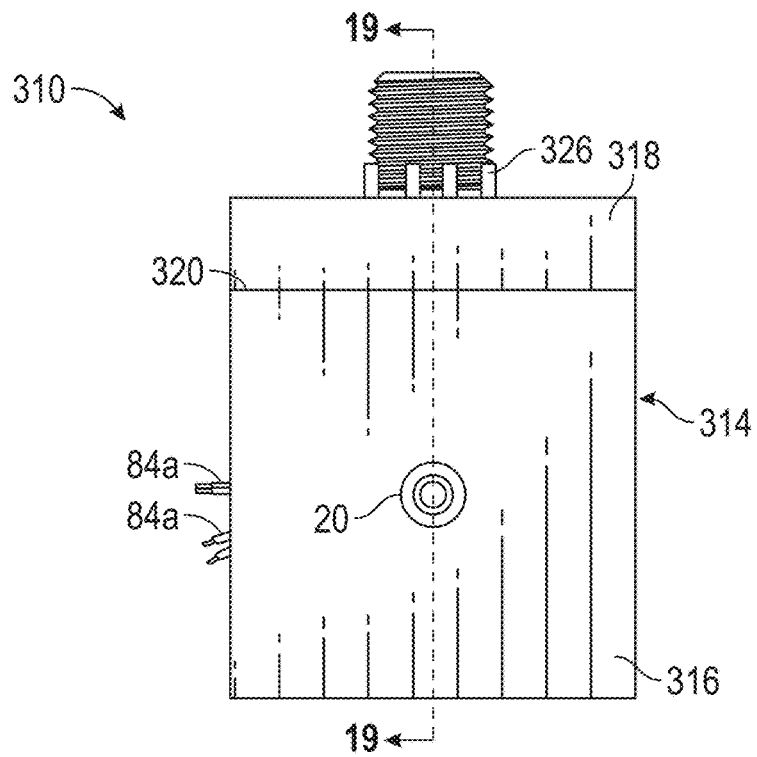
FIG. 18 is side elevational view of a third embodiment of an improved two-stage fluid control valve in accordance with this invention.
Figure 19:
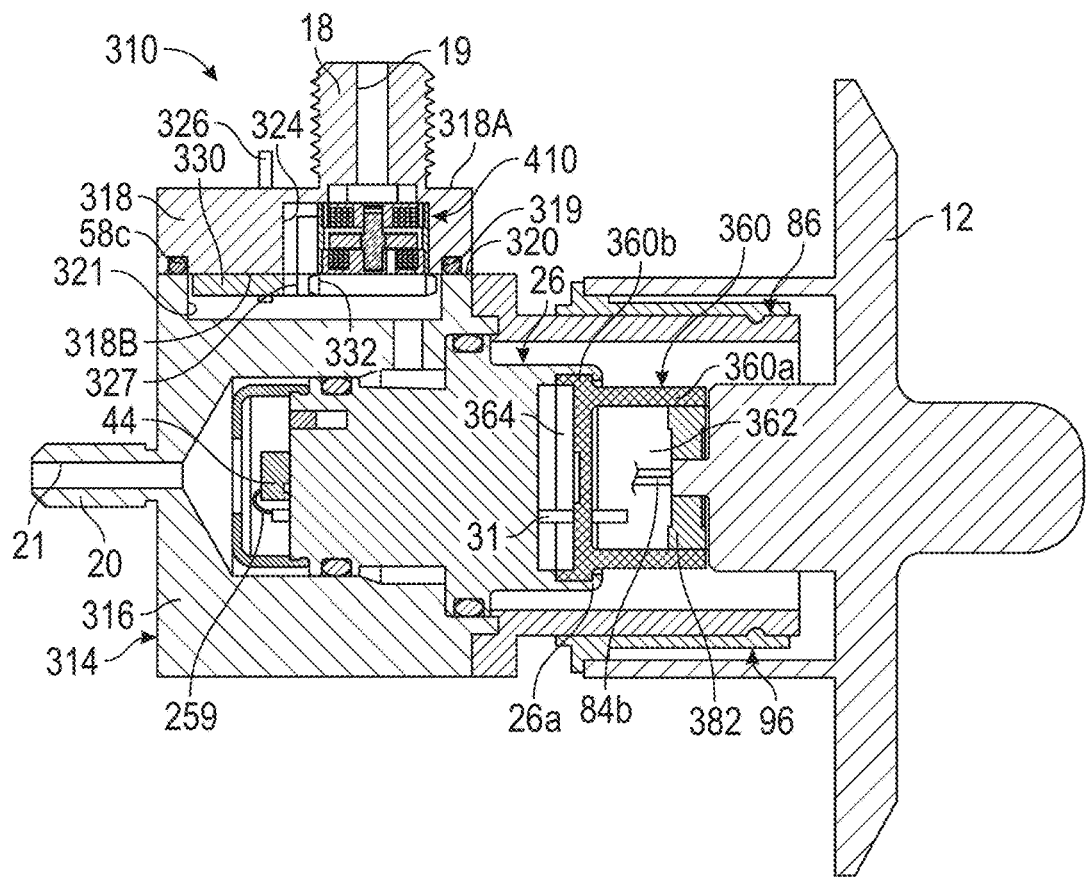
FIG. 19 is a cross-sectional view taken along the line 19-19 of FIG. 18.

FIG. 17 is a perspective view of the microvalve 44 used in the embodiments of the improved burner control valves 10 and 210 described herein. The illustrated microvalve 44 includes a cover plate 252, an intermediate plate 254, and a base plate 256.

The cover plate 252 includes electrical ports 258 for passing respective electrical wires 259 therethrough for connection to respective bond pads (not shown) formed on spaced apart portions of the intermediate plate 254, thereby permitting an electric current to pass therebetween upon connection to, and application of, electrical power from a source of electrical power (not shown). The cover plate 252 also includes a common fluid port 260.

The intermediate plate 254 includes an actuator 262 having a plurality of actuator ribs 264 formed in herringbone pattern. A central rib region 266 of the ribs 264 is joined to a moveable central spine 268, and a displaceable actuator arm 270 is operatively coupled to the spine 268. The intermediate plate 254 may also include one or more fluid flow passages 272 for purging air from an open end rib region 274 of the ribs 264 and out of the microvalve 44.

The actuator arm 270 includes a pivot anchor or hinge 276 that bends or flexes to accommodate arcuate movement of the actuator arm 270 in a plane that is substantially parallel to the cover plate 252, the intermediate plate 254, and the base plate 256. The actuator arm 270 also includes a valve element 278 having slots 280 and 281 for controlling the flow of fluid through the microvalve 44 and a plurality of pressure equalization openings 282 for reducing or preventing pressure imbalances of the valve element 278 that would otherwise tend to cause movement of the actuator arm 270 out of the plane of normal arcuate motion during actuation and un-actuation thereof.

As used in the description of the invention and the appended claims, the terms "un-actuated" and "un-actuation" are defined as a steady-state condition of the microvalve device prior to application of electrical power to; i.e., prior to the actuation of the microvalve device actuator.

An inner surface 284 of the base plate 256 includes a plurality of fluid ports for permitting passage of fluid through the microvalve 44, including a normally open fluid port 286, and a normally closed fluid port 288. An inner surface 284 of the base plate 256 also includes an actuator cavity 290.

During actuation of the microvalve 44, the ribs 264 are heated by passing an electrical current therethrough. The ribs 264 then undergo thermal expansion and elongate, which urges the spine 268 and the attached actuator arm 270 away from the ribs 264 (to the right when viewing FIG. 17). The actuator arm 270 then bends or flexes at the hinge 276 to accommodate movement of the spine 268 thereby causing the valve element 278, and its slots 280 and 281 to move in the plane of normal motion along an arcuate path (to the right when viewing FIG. 17) to a stressed position, which closes the normally open fluid port 286 and opens the normally closed fluid port 288.

When the electrical current is removed from the ribs 264, the ribs 264 cool and contract, urging the central spine 268 back toward the ribs 264 (to the left when viewing FIG. 17). The actuator arm 270 and valve element 278 then return to an un-actuated position, such as shown in FIG. 17, wherein the normally open fluid port 286 is again open, and normally closed fluid port 288 is again closed.

Referring now to FIGS. 18 through 21, the third embodiment of the improved fluid control valve 310 is also configured as a burner control valve for a gas range (not shown). Alternatively, the illustrated burner control valve 310 may be configured for use in other applications, such as for use as gas mass flow controller to control the flow of process gas in a silicon fabrication process.

The burner control valve 310 is similar to the burner control valves 10 and 210, but includes a moving magnet valve (MMV) 410, described in detail below, and a modified valve body 314, also described in detail below. A substantially cylindrical electrical cap 360 is attached to the inner valve body 26 at a first end 26a thereof. The electrical cap 360 has a first end 360a and a second end 360b, and an electrical chamber 362 formed in the first end 360a thereof. A cap seal cavity 364 is formed in the second end 60b of the electrical cap 60. A plurality of pin holes (not shown) is formed through the second end 360b of the electrical cap 360, through which one or more electrical pins 31 extend.

A variable resistor 382 may be mounted in the electrical chamber 362 formed in the first end 360a of the electrical cap 360. Electrical connectors, such as wires 84b, extend from the variable resistor 382 and electrically connect the variable resistor 382 to one or more controllers (not shown) and to the source of electrical power (not shown). The variable resistor 382 may be any conventional variable resistor configured to actuate the MMV 410, as described in detail below. The control knob 12 is also attached to the variable resistor 382.

The valve body 314 includes a first portion 316 and a second portion 318 attached to a first side 320 of the valve body 314 (the upper side when viewing FIGS. 18 through 21). A substantially cylindrical PCB opening 321 is formed in the first side 320 of the first portion 316.

Figure 22:
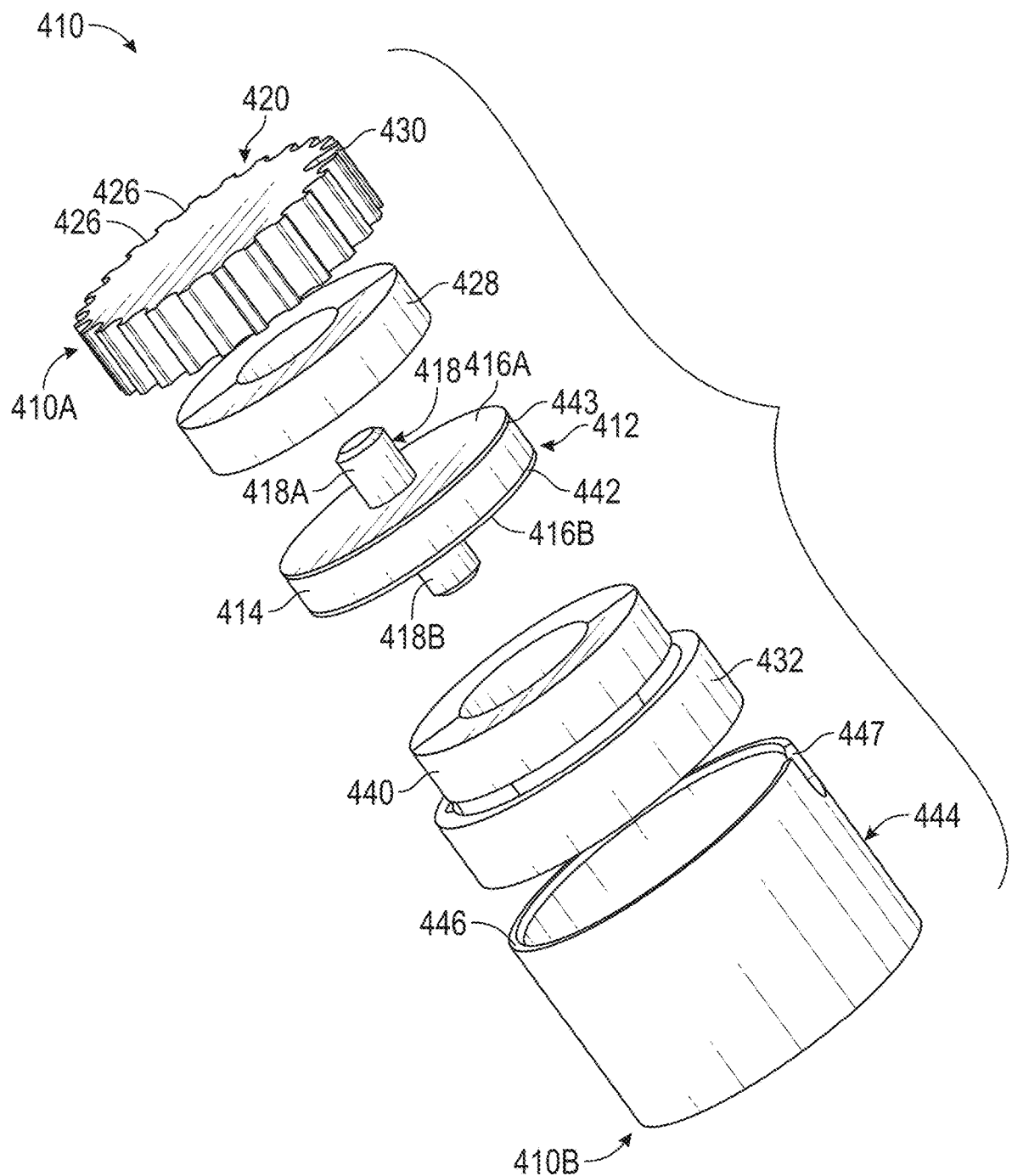
FIG. 22 is a partially exploded perspective view of an improved electronically switchable, bi-stable two-port valve.
Figure 23:
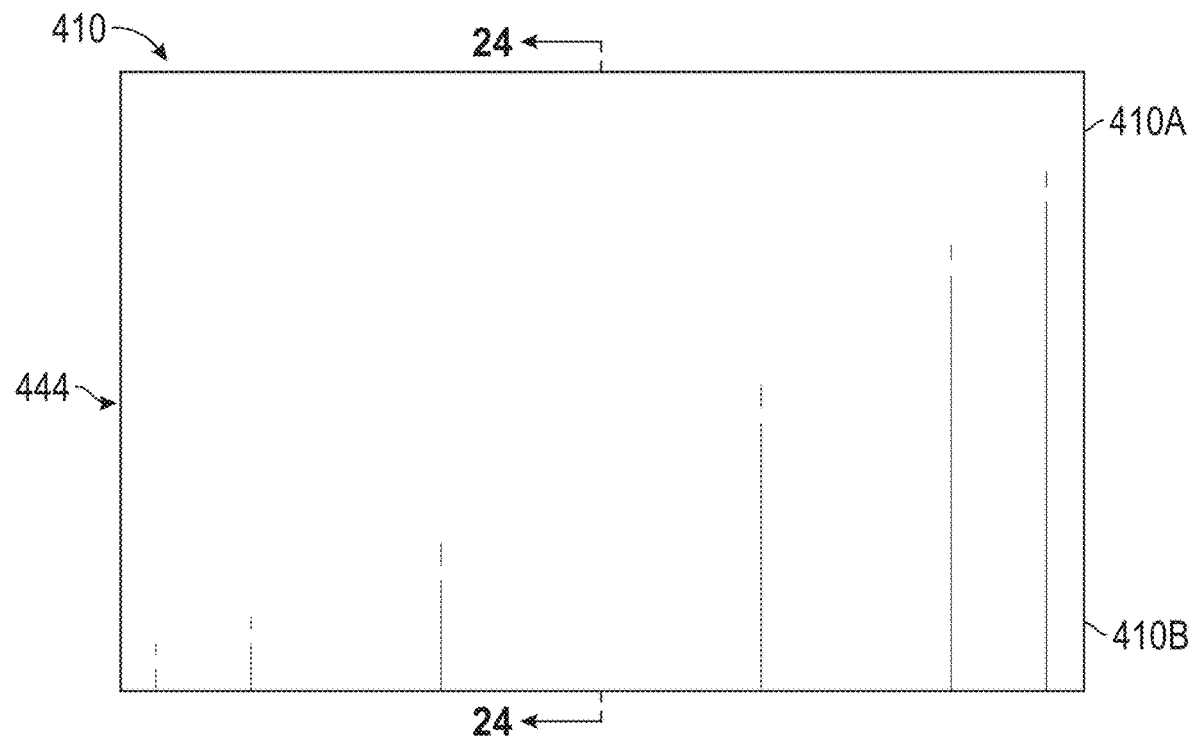
FIG. 23 is a side elevational view of the electronically switchable, bi-stable two-port valve illustrated in FIG. 22.
Figure 24:
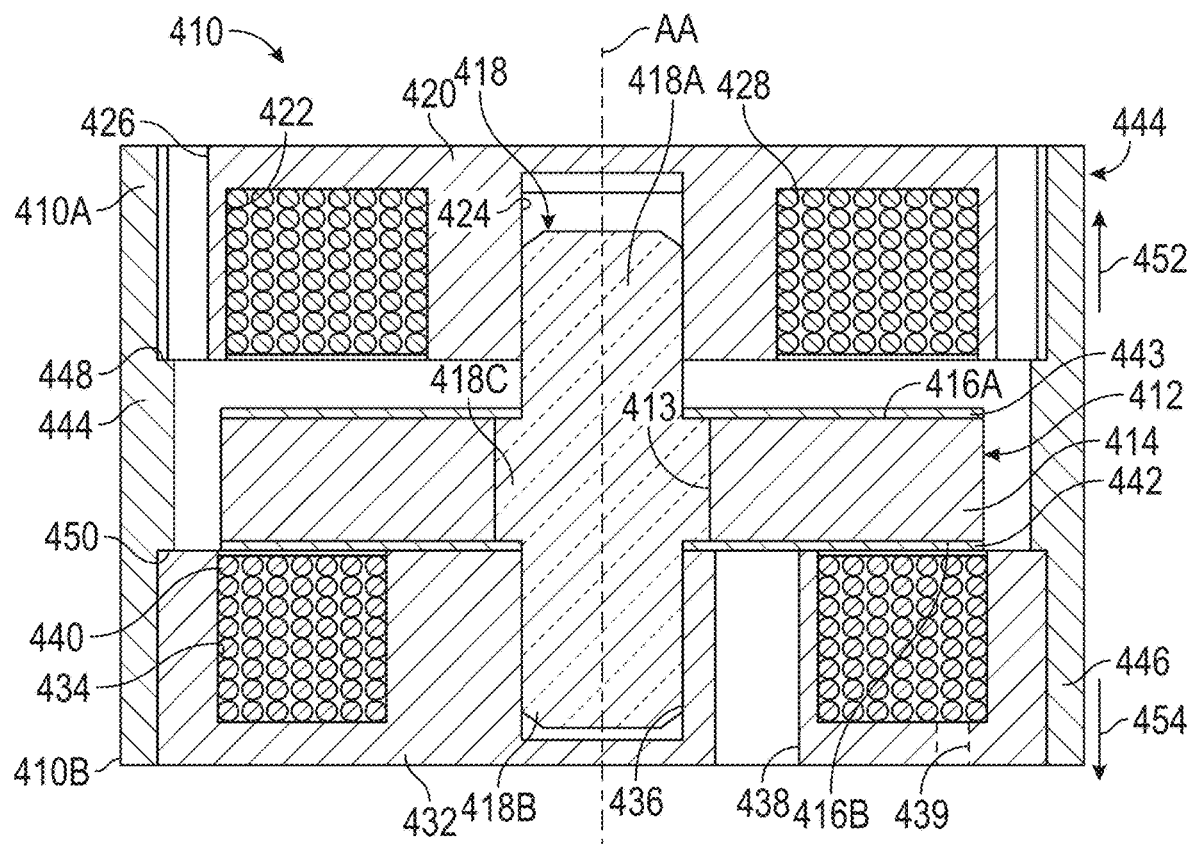
FIG. 24 is a cross-sectional view taken along the line 24-24 of FIG. 22 showing the electronically switchable, bi-stable two-port valve in the closed position.
Figure 25:
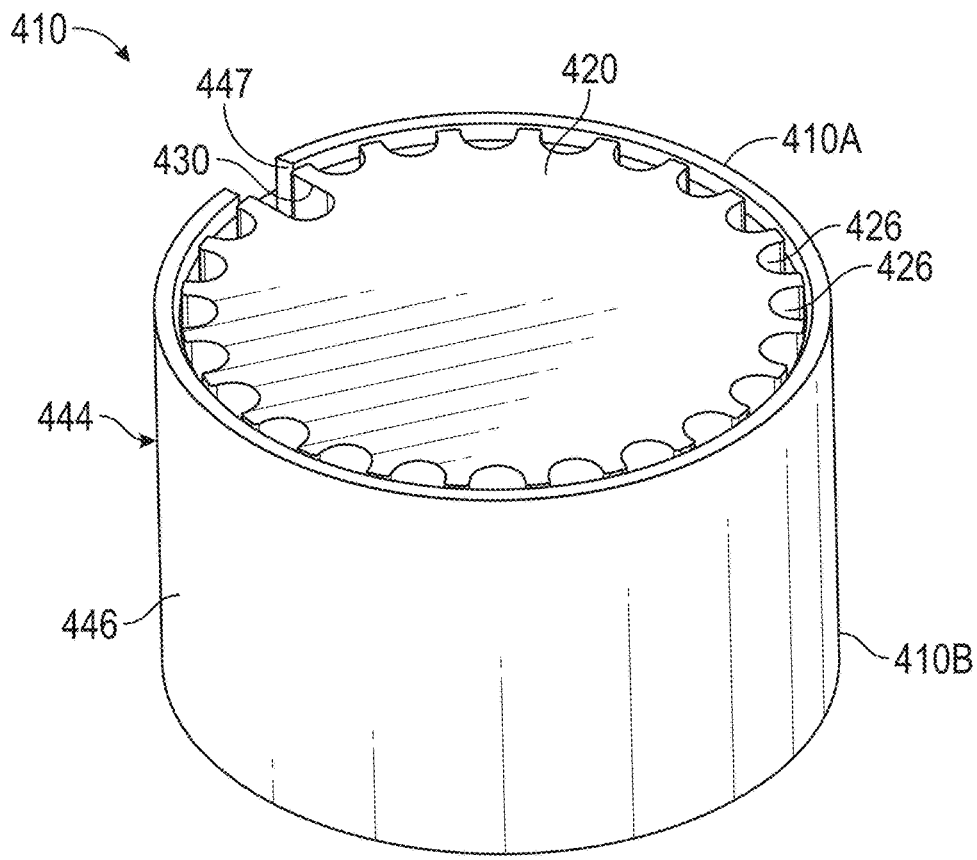
FIG. 25 is a perspective view of the electronically switchable, bi-stable two-port valve illustrated in FIGS. 22 through 24 showing the first end thereof.
Figure 26:
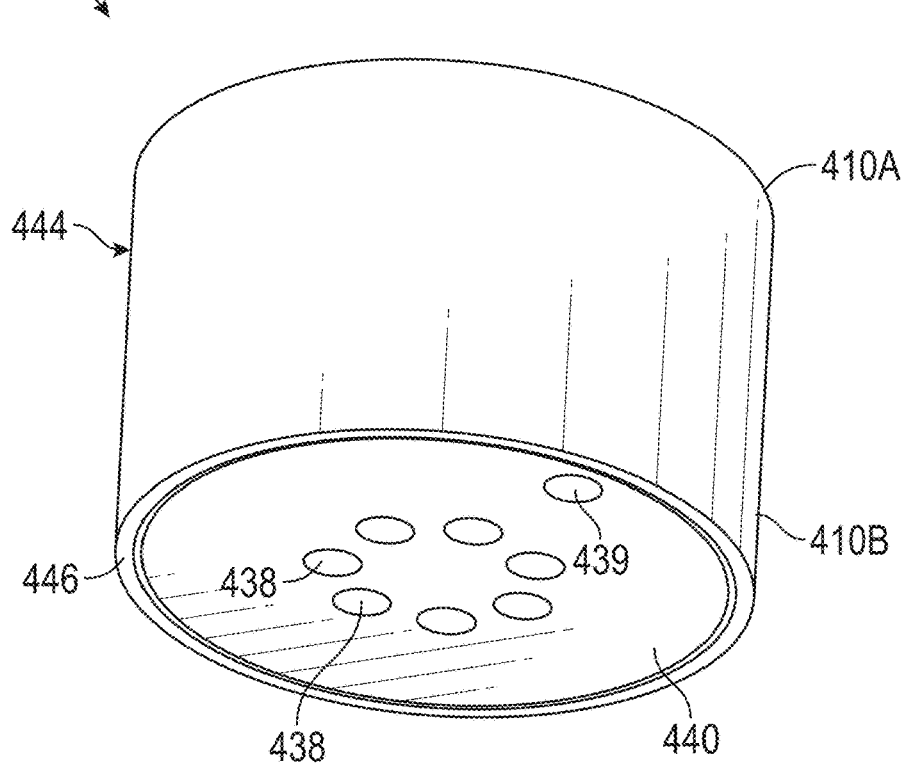
FIG. 26 is a perspective view of the electronically switchable, bi-stable two-port valve illustrated in FIGS. 22 through 25 showing the second end thereof.

The second portion 318 has a substantially rectangular prism shape having a first end 318A and a second end 318B. A substantially cylindrical valve bore 324 is formed in the first end 318A thereof. The fluid inlet fitting 18 extends outwardly from the first end 318A of the second portion 318 and defines the fluid inlet 19. Electrical connectors, such as wires 326, extend through holes in the second portion 318 from the MMV coils 428 and 440, as shown in FIGS. 22 and 24, and electrically connect the MMV coils 428 and 440 to the one or more controllers (not shown) and to the source of electrical power (not shown). The structure of the MMV 410 is described in detail below.

The illustrated first and second portions 316 and 318 are preferably formed from aluminum. Alternatively, the first and second portions 316 and 318 may be formed from any desired metal, metal alloy, and non-metal material, such as plastic. If desired, the first and second portions 316 and 318 may be die cast. The second portion 318 may be attached to the first portion 316 by any desired means, such as by welding or with threaded fasteners 322.

The MMV 410 is mounted to a disk shaped printed circuit board (PCB) 330, such as a PCB 330 formed from FR4. The PCB 330 includes a valve opening 332 over which the MMV 410 is mounted. The PCB 330 is mounted within the PCB opening 321 formed in the first side 320 of the first portion 316 and may be connected to the PCB 320 by an electrical connector, such as a wire 327.

A third annular seal 58c, such as an O-ring, may be disposed within a circumferentially extending sealing groove 319 formed in the second end 318B of the second portion 318.

Advantageously, the improved fluid control valve 310 includes a unique combination of the MMV 410 and the second stage microvalve 44. This combination allows the microvalve 44 to be used in applications where no internal valve fluid leak is permissible, and where accurate control of fluid flow is required.

The MMV 410, as described below, is an electronically switchable, bi-stable two-port valve, may be configured as a normally closed valve that opens when actuated to allow fluid or gas flow to the microvalve 44. A brief application of electric current, such as within the range of about 50 Msec to about 200 Msec, to the MMV coils 428 and 440 is sufficient to move the MMV 410 between open and leak-free closed positions.

Referring now to FIGS. 22 through 26, there is illustrated the improved MMV 410. The MMV 410 is an electronically switchable, bi-stable two-port valve that may be configured as a normally closed valve or a normally open valve. The electronically switchable, bi-stable two-port valve 410 has an axis AA, a first end 410A (the upper end when viewing FIGS. 22 through 26), and a second end 410B (the lower end when viewing FIGS. 22 through 26). A permanent magnet defines an armature 412. The armature 412 includes a substantially disk shaped body 414 having a first planar surface 416A (the upper end when viewing FIGS. 422 and 424), a second planar surface 416B (the lower end when viewing FIGS. 422 and 424), and a longitudinally extending bore 413 formed therethrough.

An axially extending member 418 is attached within the bore 413 and includes a first axially extending portion 418A that extends outwardly from the first planar surface 416A, and a second axially extending portion 418B that extends outwardly from the second planar surface 416B. The first axially extending portion 418A and the second axially extending portion 418B are substantially cylindrical in shape. A central portion 418C of the axially extending member 418 may have a diameter larger than a diameter of the first and second axially extending portions 418A and 418B. The axially extending member 418 is preferably formed from a non-magnetic material, such as brass or plastic, and may be attached to the body 414 of the armature 412 by any desired means, such as by press-fitting, staking, with an adhesive, and the like.

An annular resilient seal 442 may be attached to the second planar surface 416B. Similarly, an annular resilient member 443 may be attached to the first planar surface 416A. The seal 442 and the resilient member 443 may be formed from an elastomeric material, such as rubber. Alternatively, the seal 442 and the resilient member 443 may be formed from any other deformable material, such as urethane, nitrile, or other polymers.

As used herein, a permanent magnet is defined as a magnet formed from hard magnetic material or ferromagnetic material that exhibits strong magnetization in the absence of an external magnetic field. Once magnetized, permanent magnets tend to stay magnetized.

A first pole piece 420 is substantially cylindrical, and has a circular coil groove 422 and a centrally formed and axially extending armature receiving bore 424 formed therein. An outside surface of the first pole piece 420 includes a plurality of axially extending grooves 426 formed therein. The grooves 426 define either fluid inlet ports or fluid outlet ports. The outside surface of the first pole piece 420 also includes at least one wire groove 430 formed therein, the purpose of which will be explained in detail below. The wire groove 430 may have a radial length greater than a radial length of the axially extending grooves 426. In the illustrated embodiment, the grooves 426 have a radius of about 0.25 mm. Alternatively, the grooves 426 have any desired size, such as a radius within about 0.25 mm to about 0.3 mm. Although the grooves 426 have been described as defining either fluid inlet ports or fluid outlet ports, it will be understood that the MMV 410 may be used to control the flow of any desired fluid or gas, such as process gas or other fluid.

A magnetic field generating member is configured as a first wire-wound coil 428 and is seated in the coil groove 422.

A second pole piece 432 is substantially cylindrical, and has a circular coil groove 434 and a centrally formed and axially extending armature receiving bore 436 formed therein. A plurality of axially extending passageways 438 are formed through the second pole piece 432 about the armature receiving bore 436. The passageways 438 define either fluid inlet ports or fluid outlet ports. An axially extending wire bore 439 may also be formed through an axial end wall of the coil groove 434, the purpose of which will be explained in detail below. In the illustrated embodiment, the passageways 438 have a diameter of about 0.75 mm. Alternatively, the passageways 438 have any desired size, such as a diameter within about 0.75 mm to about 1.0 mm.

A second wire-wound coil 440 is similar to the first wire-wound coil 428 and is seated in the coil groove 434. The first and second wire-wound coils 428 and 440 may be conventional in the art and thus include wires (not shown) that electrically connect the first and second wire-wound coils 428 and 440 to a source of electrical power (not shown). The wires (not shown) connected to the first wire-wound coil 428 may extend through the wire groove 430 formed in first pole piece 420 and outward from the MMV 410. Similarly, the wires (not shown) connected to the second wire-wound coil 440 may extend through the wire bore 439 formed in second pole piece 432 and outward from the MMV 410.

The first pole piece 420 and the second pole piece 432 may be formed from any desired ferromagnetic material such steel, including mild steel. Alternatively, the first pole piece 420 and the second pole piece 432 may be formed from any other desired material, such as low carbon steel and silicon steel.

A cylindrical valve housing or sleeve 444 includes a wall 446. An inside surface of the wall 446 has a first circumferentially extending shoulder 448 and a second circumferentially extending shoulder 450 formed therein. When the MMV 410 is assembled, the first pole piece 420 is seated against the first shoulder 448 and the second pole piece 432 is seated against the second shoulder 450. As best shown in FIG. 24, the first axially extending portion 418A is slidably mounted within the armature receiving bore 424 and the second axially extending member 18B is slidably mounted within the armature receiving bore 436. The sleeve 444 may be formed from steel such as mild steel. Alternatively, the sleeve 444 may be formed from any other desired material, such as low carbon steel and silicon steel.

An axially extending slot 447 may be formed in the wall 446 and radially aligned with the wire groove 430. In the illustrated embodiment, the sleeve 444 has a height of about 6.0 mm and a diameter of about 8.0 mm. Alternatively, the sleeve 444 may have any desired size, such as a height within about 4.0 mm to about 6.0 mm, and a diameter within about 8.0 mm to about 9.0 mm.

In the embodiment illustrated in FIG. 24, the MMV 410 is shown in the closed position, wherein the second planar surface 416B of the armature 412, and the attached resilient seal 442, is urged into contact with an axial end of the second pole piece 432 (the upper end when viewing FIG. 24), closing the passageways 438. In the open position (not shown), the first planar surface 416A of the armature 412, and the attached resilient member 443, is urged against the first pole piece 420. The magnetic attraction between the armature 412 and either the first pole piece 420 or the second pole piece 432 holds the armature 412 in a fixed position until an electric current is passed through the second wire-wound coil 40 or the first wire-wound coil 428, respectively.

In the absence of an electric current in either the first or the second wire-wound coils 428 and 440, respectively, the armature 412 forms a magnetic circuit with one of the pole pieces 420 or 432 to maintain the armature 412 in either the open or the closed position (see FIG. 22). The force between the armature 412 and either the first pole piece 420 or the second pole piece 432 is sufficient to hold the armature 412 against vibration and/or flow or pressure forces attempting to move the armature 412, but low enough that the force may be overcome by the magnimotive force of the first and/or the second wire-wound coils 428 and 440 to switch between open and closed positions.

As further shown in FIG. 24, fluid flow through the MMV 410 is in the direction of the arrow 54. Thus, the grooves 426 define fluid inlet ports and the passageways 438 define fluid outlet ports. Alternatively, the MMV 410 may be configured such that the direction of the fluid flow is reversed and in the direction of the arrow 452. In this arrangement, the passageways 438 define fluid inlet ports and the grooves 426 define fluid outlet ports.

In a conventional manner, the first and second wire-wound coils 428 and 440 may be configured to generate a desired magnetic field, such as a magnetomotive force between about 140 to about 180 amp-turns.

In the absence of an electric current in either of the first or the second wire-wound coils 428 and 440, the armature 412 will remain in either the open position (not shown) or the closed position (see FIG. 24). In FIG. 24, the MMV 410 is shown in the closed position, wherein the second planar surface 416B of the armature 412, and the seal 442 attached thereto, is urged into contact with an axial end of the second pole piece 432 (the upper end when viewing FIG. 24).

In the open position (not shown), the first planar surface 416A of the armature 412 is urged against the first pole piece 420. The magnetic attraction between the armature 412 and either the first pole piece 420 or the second pole piece 432 holds the armature 412 in a fixed position until an electric current is passed through the second wire-wound coil 440 or the first wire-wound coil 428, respectively.

In operation, the MMV 410 may be toggled or moved between the closed position as shown in FIG. 24 and the open position (not shown). In the closed position, the armature 412, and the seal 442 attached thereto, is urged into contact with an axial end of the second pole piece 432 (the upper end when viewing FIG. 24). The armature 412 thus closes the passageways 438 such that the flow of fluid therethrough is prevented. The force due to the fluid pressure applied to the MMV 410 through the grooves 426 and the magnetic force between the armature 412 and the second pole piece 432 maintains the MMV 410 in the closed position.

A brief application of electric current, such as within the range of about 50 Msec to about 200 Msec, to the MMV coils 428 and 440 is sufficient to move the MMV 410 between open and closed positions When the MMV 410 is in the closed position as shown in FIG. 24, and the electric current has been removed from the second wire-wound coil 440, the magnetic force between the armature 412 and the second pole piece 432 maintains the MMV 410 in the closed position. When an electric current is then briefly passed through the first wire-wound coil 428, the first pole piece 420 is magnetized, and the strength of the magnetic force between the armature 412 and the first pole piece 420 is greater relative to the strength of the magnetic force between the armature 412 and the second pole piece 432. The armature 412 then moves toward the first pole piece 420; i.e., in the direction of the arrow 52, until the armature 412, and the resilient member 443 attached thereto, is urged into contact with an axial end of the first pole piece 420 (the lower end when viewing FIG. 24), thus moving the MMV 410 to the open position. When the brief application of electric current to the first wire-wound coil 428 is removed, the magnetic force between the armature 412 and the first pole piece 420 maintains the MMV 410 in the open position.

In the open position, armature 412 is moved away from the second pole piece 432, thus opening the passageways 438 such that the flow of fluid therethrough is permitted. It will be appreciated that when the MMV 410 is in either the closed position or the open position, the grooves 426 are not closed by the armature 412.

The MMV 410 may be moved from the open position to the closed position in the same way. Thus, when the MMV 410 in the open position, and when an electric current is then briefly passed through the second wire-wound coil 440, the second pole piece 432 is magnetized, and the strength of the magnetic force between the armature 412 and the second pole piece 432 is greater relative to the strength of the magnetic force between the armature 412 and the first pole piece 420. The armature 412 then moves toward the second pole piece 432; i.e., in the direction of the arrow 454, until the armature 412, and the seal 442 attached thereto, is again urged into contact with the axial end of the second pole piece 432 (the upper end when viewing FIG. 24), and into the closed position. Thus by alternatingly applying an electric current to the first and second wire-wound coils 428 and 440, the MMV 410 may be toggled or moved between the closed position as shown in FIG. 24 and the open position (not shown).

In a first alternative embodiment, an electric current may be applied briefly and simultaneously to the first wire-wound coil 428 and the second wire-wound coil 440 such that the electric current flows in a clockwise direction in one of the first or the second wire-wound coils 428 and 440 and in a counterclockwise direction in the other of the first of the second wire-wound coils 428 and 440. When the electric current is briefly applied in this manner, the MMV 410 will move alternately between the open and closed positions each time the electric current is briefly applied and depending on the orientation of the permanent magnet armature 412.

In a second alternative embodiment, an electric current may be applied briefly and simultaneously to the first wire-wound coil 428 and the second wire-wound coil 440 such that the electric current flows in the same direction, i.e., either in a clockwise direction or in a counterclockwise direction, in both the first and second wire-wound coils 428 and 440. When the electric current is briefly applied in this manner, the MMV 410 will move alternately between the open and closed positions each time the electric current is briefly applied and depending on the orientation of the permanent magnet armature 412.

Advantageously, the MMV 410 may remain in either the closed position, as shown in FIG. 24, or the open position (not shown) when power has been removed from the first wire-wound coil 428 and the second wire-wound coil 440.

In operation, a user may turn the control knob 12 clockwise. As the control knob 12 is rotated, the variable resistor 82 may send a signal to the one or more controllers (not shown). The controller actuates the MMV 410, allowing gas to pass therethrough. The controller also actuates the microvalve 44, allowing gas to pass therethrough to a gas burner as described above. If desired, the controller may also send a signal to actuate an electronic igniter, if provided, simultaneously with the signal to actuate the microvalve 44.

The microvalve 44 may then be modulated by the movement of the control knob 12 to very precisely control the flow of fluid, such as process gas or propane, outwardly through the fluid outlet 21. Significantly, the microvalve 44 additionally provides improved flame control and improved temperature control. For example, the flow of gas through the burner control valve 310 may be controlled to flow within the range of from about 5% to about 100% of a maximum flow rate of the burner control valve 10.

As described above, the MMV 410 may be moved alternately between the open and closed positions. Turning the control knob 12 clockwise thus moves the MMV 410 from the closed position to the open position such that gas is permitted to flow through the MMV 410, to the second stage microvalve 44, through which fluid flow may be very accurately controlled.

The combination of the first stage MMV 410 and the second stage microvalve 44 in the burner control valve 310 provides a fluid control valve with an advantageous positive shut-off function at the MMV 410. As used herein, a positive shut-off of the MMV 410 is defined as when the MMV 410 is in the leak free closed position.

Thus, a microvalve such as the microvalve 44 may be used in two-stage fluid control valves applications where internal valve leakage is not permitted, but where accurate fluid flow control, such as provided by the microvalve 44, is required.

The principle and mode of operation of this invention have been explained and illustrated in its preferred embodiment. However, it must be understood that this invention may be practiced otherwise than as specifically explained and illustrated without departing from its spirit or scope.

What is claimed:

1. A two-stage burner control valve comprising:
   a first stage moving magnet valve (MMV) configured as an electronically switchable, bi-stable two-port valve movable between an open position and a leak-free closed position; and
   a second stage silicon microvalve configured to control the flow of fluid through a fluid outlet of the two-stage fluid control valve when the first stage electronically switchable, bi-stable two-port valve is in the open position;
   wherein the MMV is disposed between the second stage microvalve and a fluid inlet of the two-stage fluid control valve;
   wherein the MMV comprises:
      a sleeve;
      a first pole piece having fluid flow passages formed therethrough and a first wire-wound coil mounted therein and connected to a source of electrical power;
      a second pole piece having fluid flow passages formed therethrough and a second wire-wound coil mounted therein and connected to the source of electrical power;
   wherein the first pole piece is mounted in a first end of the sleeve and the second pole piece is mounted in a second end of the sleeve; and
   a permanent magnet defining an armature and movably mounted between the first and second pole pieces.

2. The two-stage burner control valve according to claim 1, wherein the first and second wire-wound coils have a magnetomotive force between about 140 to about 180 amp-turns.

3. The two-stage burner control valve according to claim 1, wherein the first pole piece is substantially cylindrical, and has a circular coil groove and a centrally formed and axially extending armature receiving bore formed therein.

4. The two-stage burner control valve according to claim 3, wherein an outside surface of the first pole piece includes a plurality of axially extending grooves formed therein, the grooves defining one of fluid inlet ports and fluid outlet ports.

5. The two-stage burner control valve according to claim 4, wherein the outside surface of the first pole piece further includes at least one wire groove formed therein.

6. The two-stage burner control valve according to claim 1, wherein the second pole piece is substantially cylindrical, and has a circular coil groove and a centrally formed and axially extending armature receiving bore formed therein.

7. The two-stage burner control valve according to claim 6, wherein a plurality of axially extending passageways are formed through the second pole piece about the armature receiving bore, the passageways defining one of fluid inlet ports and fluid outlet ports.

8. The two-stage burner control valve according to claim 7, wherein an axially extending wire bore is formed through an axial end wall of the coil groove.

9. The two-stage burner control valve according to claim 1, wherein the first and second pole pieces are formed from ferromagnetic material.

10. The two-stage burner control valve according to claim 1, wherein the armature includes a substantially disk shaped body having a first planar surface, a second planar surface, and a longitudinally extending bore formed therethrough, and wherein an axially extending member is attached within the longitudinally extending bore and includes a first axially extending portion that extends outwardly from the first planar surface and a second axially extending portion that extends outwardly from the second planar surface.

11. The two-stage burner control valve according to claim 10, wherein a central portion of the axially extending member has a diameter larger than a diameter of the first and second axially extending portions and is attached within the longitudinally extending bore of the body of the armature.

12. The two-stage burner control valve according to claim 11, further including one of a resilient seal attached to the second planar surface and a resilient member attached to the first planar surface.

13. A method of controlling a two-stage fluid control valve comprising:
   providing a first stage electronically switchable, bi-stable two-port valve movable between an open position and a leak-free closed position;
   providing a second stage microvalve configured to control the flow of fluid through a fluid outlet of the two-stage fluid control valve when the first stage electronically switchable, bi-stable two-port valve is in the open position;

wherein the electronically switchable, bi-stable two-port valve is disposed between the second stage microvalve and a fluid inlet of the two-stage fluid control valve, has a sleeve, a first pole piece having fluid flow passages formed therethrough and a first wire-wound coil mounted therein and connected to a source of electrical power, a second pole piece having fluid flow passages formed therethrough, and a second wire-wound coil mounted therein and connected to the source of electrical power, and wherein the first pole piece is mounted in a first end of the sleeve and the second pole piece is mounted in a second end of the sleeve, and a permanent magnet defining an armature and movably mounted between the first and second pole pieces;

applying an electric current to the first wire-wound coil to magnetize the first pole piece, thus causing the armature to move toward the first pole piece and to the open position;

removing the electric current from the first wire-wound coil; and subsequently applying an electric current to the second wire-wound coil to magnetize the second pole piece, thus causing the armature to move toward the second pole piece and to the closed position.

14. The method according to claim 13, further including alternatingly applying electric current to the first and second wire-wound coils to cause the armature to move alternatingly between the open and the closed positions.

15. The method according to claim 14, wherein the electric current applied to the first and second wire-wound coils is sufficient to create a magnetomotive force between about 140 to about 180 amp-turns.

16. The method according to claim 14, further including removing the electric current from both the first and second wire-wound coils, thus causing the armature to be held against the one of the first and second pole pieces to which the armature is closest.

17. The method according to claim 13, wherein when the electric current is removed from one of the first wire-wound coil and the second wire-wound coil, the armature forms a magnetic circuit with one of the first pole piece and the second pole piece to maintain the armature in one of the open position and the closed position.

18. A method of controlling a two-stage fluid control valve comprising:
providing a first stage electronically switchable, bi-stable two-port valve movable between an open position and a leak-free closed position;
providing a second stage microvalve configured to control the flow of fluid through a fluid outlet of the two-stage fluid control valve when the first stage electronically switchable, bi-stable two-port valve is in the open position;
wherein the electronically switchable, bi-stable two-port valve is disposed between the second stage microvalve and a fluid inlet of the two-stage fluid control valve, has a sleeve, a first pole piece having fluid flow passages formed therethrough and a first wire-wound coil mounted therein and connected to a source of electrical power, a second pole piece having fluid flow passages formed therethrough, and a second wire-wound coil mounted therein and connected to the source of electrical power, and wherein the first pole piece is mounted in a first end of the sleeve and the second pole piece is mounted in a second end of the sleeve, and a permanent magnet defining an armature and movably mounted between the first and second pole pieces;
briefly and simultaneously applying an electric current to the first wire-wound coil and the second wire-wound coil such that the electric current flows in a clockwise direction in one of the first and the second wire-wound coils and in a counterclockwise direction in the other of the first and the second wire-wound coils, thus causing the armature to move alternately between the open and closed positions each time the electric current is applied; and
repeating the brief and simultaneous application of electric current to the first wire-wound coil and the second wire-wound coil.

19. A method of controlling a two-stage fluid control valve comprising:
providing a first stage electronically switchable, bi-stable two-port valve movable between an open position and a leak-free closed position;
providing a second stage microvalve configured to control the flow of fluid through a fluid outlet of the two-stage fluid control valve when the first stage electronically switchable, bi-stable two-port valve is in the open position;
wherein the electronically switchable, bi-stable two-port valve is disposed between the second stage microvalve and a fluid inlet of the two-stage fluid control valve, has a sleeve, a first pole piece having fluid flow passages formed therethrough and a first wire-wound coil mounted therein and connected to a source of electrical power, a second pole piece having fluid flow passages formed therethrough, and a second wire-wound coil mounted therein and connected to the source of electrical power, and wherein the first pole piece is mounted in a first end of the sleeve and the second pole piece is mounted in a second end of the sleeve, and a permanent magnet defining an armature and movably mounted between the first and second pole pieces;
briefly and simultaneously applying an electric current to the first wire-wound coil and the second wire-wound coil such that the electric current flows in the same direction in each of the first wire-wound coil and the second wire-wound coil, thus causing the armature to move alternately between the open and closed positions each time the electric current is applied; and
repeating the brief and simultaneous application of electric current the same direction to the first wire-wound coil and the second wire-wound coil.

* * * * *